(12) United States Patent
Chen et al.

(10) Patent No.: US 9,274,318 B1
(45) Date of Patent: Mar. 1, 2016

(54) OPTICAL IMAGING LENS AND ELECTRONIC DEVICE COMPRISING THE SAME

(71) Applicants: Shih-Han Chen, Taichung (TW);
Yanbin Chen, Taichung (TW);
Changlin Zhao, Taichung (TW)

(72) Inventors: Shih-Han Chen, Taichung (TW);
Yanbin Chen, Taichung (TW);
Changlin Zhao, Taichung (TW)

(73) Assignee: Genius Electronic Optical Co., Ltd., Daya District, Taichung (TW)

( * ) Notice: Subject to any disclaimer, the term of this patent is extended or adjusted under 35 U.S.C. 154(b) by 0 days.

(21) Appl. No.: 14/529,160

(22) Filed: Oct. 31, 2014

(30) Foreign Application Priority Data

Aug. 6, 2014 (CN) .......................... 2014 1 0383432

(51) Int. Cl.
*G02B 9/62* (2006.01)
*G02B 13/00* (2006.01)
*H04N 5/225* (2006.01)

(52) U.S. Cl.
CPC .............. *G02B 13/0045* (2013.01); *G02B 9/62* (2013.01); *H04N 5/2252* (2013.01); *H04N 5/2253* (2013.01)

(58) Field of Classification Search
CPC ..... G02B 13/0045; G02B 9/62; H04N 5/2254
See application file for complete search history.

(56) References Cited

U.S. PATENT DOCUMENTS

| 7,830,620 | B2 | 11/2010 | Asami |
| 8,379,323 | B2* | 2/2013 | Huang et al. ....... G02B 13/0045 359/713 |
| 2014/0111872 | A1 | 4/2014 | Tang |

FOREIGN PATENT DOCUMENTS

| TW | 201317620 | 5/2013 |
| TW | 201400854 | 1/2014 |

* cited by examiner

*Primary Examiner* — Joseph P Martinez
(74) *Attorney, Agent, or Firm* — Winston Hsu; Scott Margo

(57) ABSTRACT

An optical imaging lens includes: a first, second, third, fourth, fifth and sixth lens element, the first lens element has a positive refracting power, the second lens element has a negative refracting power and an object-side surface with a concave part in a vicinity of its periphery, the third lens element has an object-side surface with a concave part in a vicinity of its periphery, and an image-side surface with a convex part in a vicinity of the optical axis, the fourth lens has an image-side surface with a convex part in a vicinity of the optical axis, the fifth lens element has object-side surface with a concave part in a vicinity of its periphery, and an image-side surface with a convex part in a vicinity of the optical axis, the sixth lens element has an image-side surface with a convex part in a vicinity of its periphery.

18 Claims, 25 Drawing Sheets

| First Example ||||||||
|---|---|---|---|---|---|---|---|
| | EFL(Effective Focal Length)= 3.747 mm., HFOV(Half Field Of View)= 38.86 deg., Total Length=4.978mm., Fno= 2.0 |
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.2150 | | | | |
| 11 | First Lens | 2.1286 | 0.6720 | 1.544 | 56.114 | 3.654 | Plastic |
| 12 | | -28.2389 | 0.0830 | | | | |
| 21 | Second Lens | 3.6255 | 0.2400 | 1.640 | 23.529 | -5.543 | Plastic |
| 22 | | 1.7528 | 0.2790 | | | | |
| 31 | Third Lens | 18.2592 | 0.4879 | 1.544 | 56.114 | 4.201 | Plastic |
| 32 | | -2.5981 | 0.0966 | | | | |
| 41 | Fourth Lens | -2.3615 | 0.3732 | 1.544 | 56.114 | -211.433 | Plastic |
| 42 | | -2.5454 | 0.3367 | | | | |
| 51 | Fifth Lens | -0.7987 | 0.3068 | 1.640 | 23.529 | -6.412 | Plastic |
| 52 | | -1.1391 | 0.0982 | | | | |
| 61 | Sixth Lens | 0.8594 | 0.5344 | 1.531 | 55.744 | 9.817 | Plastic |
| 62 | | 0.8061 | 0.5000 | | | | |
| 72 | Filter | infinity | 0.2100 | | | | |
| | Filter -Image Plane | infinity | 0.7598 | | | | |
| 71 | Image Plane | infinity | | | | | |

FIG. 18

| No. | K | a2 | a4 | a6 | a8 |
|---|---|---|---|---|---|
| First object-side surface 11 | -0.788241328 | 0 | 0.018667188 | -0.019907372 | 0.050626567 |
| First image-side surface 12 | 100.0632989 | 0 | -0.057924901 | 0.154149431 | -0.184202026 |
| Second object-side surface 21 | -0.177849952 | 0 | -0.271102065 | 0.354852172 | -0.29309755 |
| Second image-side surface 22 | -6.344671967 | 0 | -0.132609391 | 0.160406687 | -0.086495332 |
| Third object-side surface 31 | 43.35650551 | 0 | -0.115339518 | -0.025745316 | 0.061380937 |
| Third image-side surface 32 | 2.54507765 | 0 | -0.057844736 | -0.018885496 | 0.076569059 |
| Fourth object-side surface 41 | 2.457999386 | 0 | 0.010940168 | 0.041037232 | 0.072947616 |
| Fourth image-side surface 42 | 2.302429129 | 0 | -0.003853567 | 0.025848811 | 0.045545503 |
| Fifth object-side surface 51 | -7.532255412 | 0 | -0.354079584 | 0.308687011 | -0.193153666 |
| Fifth image-side surface 52 | -1.142086699 | 0 | 0.034246715 | -0.039664292 | 0.021953037 |
| Sixth object-side surface 61 | -6.260292749 | 0 | -0.094760484 | 0.012821823 | -0.001967777 |
| First object-side surface 11 | -4.128273897 | 0 | -0.067799059 | 0.013175679 | -0.002066956 |

| No. | a10 | a12 | a14 | a16 |
|---|---|---|---|---|
| First object-side surface 11 | -0.055277379 | -0.017921103 | 0.066098443 | -0.033218202 |
| First image-side surface 12 | 0.04244797 | 0.018279411 | 0 | 0 |
| Second object-side surface 21 | -0.016685522 | 0.066359227 | 0.054590908 | -0.03511852 |
| Second image-side surface 22 | -0.081069759 | 0.028945816 | 0.059082466 | -0.026710238 |
| Third object-side surface 31 | -0.030120571 | 0.025262272 | -0.000682497 | -0.004332193 |
| Third image-side surface 32 | -0.015259548 | 0.022529758 | -0.004167863 | -0.004098052 |
| Fourth object-side surface 41 | -0.05123955 | -0.003966888 | -0.007421528 | 0.009791369 |
| Fourth image-side surface 42 | -0.043080599 | 0.009545655 | -0.00441277 | 0.003209212 |
| Fifth object-side surface 51 | 0.175673813 | -0.115886272 | 0.039811129 | -0.005570674 |
| Fifth image-side surface 52 | 0.020813065 | -0.010522751 | 1.95822E-05 | 0.000334499 |
| Sixth object-side surface 61 | 0.000999012 | -0.00014165 | -1.81065E-06 | 9.57057E-07 |
| First object-side surface 11 | 0.000203514 | -1.86403E-05 | 1.61713E-06 | -4.23656E-08 |

FIG. 19

| Second Example |||||||
|---|---|---|---|---|---|---|
| EFL(Effective Focal Length)= 3.689 mm., HFOV(Half Field Of View)= 40.00 deg., Total Length=5.052mm., Fno= 2.0 |||||||
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.1778 | | | | |
| 11 | First Lens | 2.1737 | 0.5341 | 1.544 | 56.114 | 3.774 | Plastic |
| 12 | | -36.1287 | 0.1128 | | | | |
| 21 | Second Lens | 3.4750 | 0.2389 | 1.640 | 23.529 | -5.782 | Plastic |
| 22 | | 1.7498 | 0.3020 | | | | |
| 31 | Third Lens | 15.6099 | 0.4881 | 1.544 | 56.114 | 4.100 | Plastic |
| 32 | | -2.5841 | 0.0688 | | | | |
| 41 | Fourth Lens | -2.3695 | 0.3739 | 1.544 | 56.114 | -203.171 | Plastic |
| 42 | | -2.5561 | 0.3866 | | | | |
| 51 | Fifth Lens | -0.7439 | 0.3032 | 1.640 | 23.529 | -4.379 | Plastic |
| 52 | | -1.1715 | 0.0698 | | | | |
| 61 | Sixth Lens | 0.9948 | 0.8341 | 1.531 | 55.744 | 5.707 | Plastic |
| 62 | | 1.0475 | 0.5000 | | | | |
| 72 | Filter | infinity | 0.2100 | | | | |
| | Filter -Image Plane | infinity | 0.6297 | | | | |
| 71 | Image Plane | infinity | | | | | |

FIG. 20

| No. | K | a2 | a4 | a6 | a8 |
|---|---|---|---|---|---|
| First object-side surface 11 | -0.773831103 | 0 | 0.018727657 | -0.018716325 | 0.050164818 |
| First image-side surface 12 | -124.6807736 | 0 | -0.056602696 | 0.153951622 | -0.184194867 |
| Second object-side surface 21 | 0.309321519 | 0 | -0.269358085 | 0.354345536 | -0.294166342 |
| Second image-side surface 22 | -6.147200863 | 0 | -0.130092268 | 0.162138921 | -0.085993289 |
| Third object-side surface 31 | -18.95571664 | 0 | -0.117151754 | -0.027727721 | 0.061009165 |
| Third image-side surface 32 | 2.613858 | 0 | -0.060693837 | -0.019598167 | 0.075692065 |
| Fourth object-side surface 41 | 2.448817835 | 0 | 0.014312624 | 0.040029891 | 0.072877536 |
| Fourth image-side surface 42 | 2.32071787 | 0 | -0.010676753 | 0.027546152 | 0.046421291 |
| Fifth object-side surface 51 | -6.263050726 | 0 | -0.348905228 | 0.308609517 | -0.193351109 |
| Fifth image-side surface 52 | -1.042376707 | 0 | 0.02892082 | -0.039783651 | 0.022025793 |
| Sixth object-side surface 61 | -7.589394732 | 0 | -0.094407636 | 0.012849508 | -0.001966066 |
| First object-side surface 11 | -4.013260581 | 0 | -0.067793019 | 0.013130998 | -0.00206619 |

| No. | a10 | a12 | a14 | a16 |
|---|---|---|---|---|
| First object-side surface 11 | -0.056683561 | -0.01928623 | 0.065226293 | -0.033524078 |
| First image-side surface 12 | 0.041778071 | 0.01613238 | 0 | 0 |
| Second object-side surface 21 | -0.017545625 | 0.066378634 | 0.055359433 | -0.033802473 |
| Second image-side surface 22 | -0.081057313 | 0.029156925 | 0.059364466 | -0.026408562 |
| Third object-side surface 31 | -0.029949994 | 0.025188118 | -0.000813996 | -0.004479324 |
| Third image-side surface 32 | -0.015589001 | 0.02242093 | -0.004201976 | -0.004068964 |
| Fourth object-side surface 41 | -0.050637405 | -0.003527522 | -0.007251168 | 0.009829279 |
| Fourth image-side surface 42 | -0.042885081 | 0.00954827 | -0.004434111 | 0.003200191 |
| Fifth object-side surface 51 | 0.17568503 | -0.115871369 | 0.03979592 | -0.005597036 |
| Fifth image-side surface 52 | 0.020841467 | -0.010513634 | 2.31137E-05 | 0.000336512 |
| Sixth object-side surface 61 | 0.000999691 | -0.000141392 | -1.7366E-06 | 9.75416E-07 |
| First object-side surface 11 | 0.000204252 | -1.85232E-05 | 1.62877E-06 | -4.18985E-08 |

FIG. 21

| Third Example | | | | | | |
|---|---|---|---|---|---|---|
| EFL(Effective Focal Length)= 3.677 mm., HFOV(Half Field Of View)= 39.99 deg., Total Length=5.171mm., Fno= 2.0 | | | | | | |
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.1800 | | | | |
| 11 | First Lens | 2.2896 | 0.4971 | 1.544 | 56.114 | 3.781 | Plastic |
| 12 | | -19.3838 | 0.0999 | | | | |
| 21 | Second Lens | 3.3765 | 0.2398 | 1.640 | 23.529 | -5.538 | Plastic |
| 22 | | 1.6868 | 0.2960 | | | | |
| 31 | Third Lens | 19.0799 | 0.5870 | 1.544 | 56.114 | 4.078 | Plastic |
| 32 | | -2.4929 | 0.0840 | | | | |
| 41 | Fourth Lens | -2.3613 | 0.3147 | 1.544 | 56.114 | -197.366 | Plastic |
| 42 | | -2.5278 | 0.3142 | | | | |
| 51 | Fifth Lens | -0.8076 | 0.4546 | 1.640 | 23.529 | -9.262 | Plastic |
| 52 | | -1.1399 | 0.0699 | | | | |
| 61 | Sixth Lens | 0.9107 | 0.5439 | 1.531 | 55.744 | 11.487 | Plastic |
| 62 | | 0.8477 | 0.5000 | | | | |
| 72 | Filter | infinity | 0.2100 | | | | |
| | Filter -Image Plane | infinity | 0.9604 | | | | |
| 71 | Image Plane | infinity | | | | | |

FIG. 22

| No. | K | a2 | a4 | a6 | a8 |
|---|---|---|---|---|---|
| First object-side surface 11 | -0.98822676 | 0 | 0.017371648 | -0.023921337 | 0.057912097 |
| First image-side surface 12 | 339.0924368 | 0 | -0.047658466 | 0.177641155 | -0.18379519 |
| Second object-side surface 21 | 0 | 0 | -0.245432915 | 0.362717452 | -0.286550184 |
| Second image-side surface 22 | -5.941793453 | 0 | -0.111549531 | 0.162935961 | -0.088015515 |
| Third object-side surface 31 | 0 | 0 | -0.085818447 | -0.040442441 | 0.060734171 |
| Third image-side surface 32 | 2.428711271 | 0 | -0.057786775 | -0.013682524 | 0.072680566 |
| Fourth object-side surface 41 | 2.465855143 | 0 | -0.019292524 | 0.036257899 | 0.078310955 |
| Fourth image-side surface 42 | 2.27891572 | 0 | -0.018183976 | 0.016491905 | 0.046262116 |
| Fifth object-side surface 51 | -6.306295869 | 0 | -0.358307021 | 0.31096366 | -0.189940942 |
| Fifth image-side surface 52 | -1.091415191 | 0 | 0.031980494 | -0.038887021 | 0.020768039 |
| Sixth object-side surface 61 | -4.868096697 | 0 | -0.081030135 | 0.010600299 | -0.002181774 |
| First object-side surface 11 | -3.94324261 | 0 | -0.057026771 | 0.006696208 | -0.000491588 |

| No. | a10 | a12 | a14 | a16 |
|---|---|---|---|---|
| First object-side surface 11 | -0.052733149 | -0.020213716 | 0.062801489 | -0.03500363 |
| First image-side surface 12 | 0.040829735 | 0.005331566 | 0 | 0 |
| Second object-side surface 21 | -0.025736605 | 0.051328671 | 0.045395866 | -0.031650329 |
| Second image-side surface 22 | -0.081783653 | 0.027798029 | 0.05784661 | -0.027584511 |
| Third object-side surface 31 | -0.029285748 | 0.025185625 | -0.00130657 | -0.005061031 |
| Third image-side surface 32 | -0.019107872 | 0.020291718 | -0.005029938 | -0.004121685 |
| Fourth object-side surface 41 | -0.047677564 | -0.003293394 | -0.008277665 | 0.008537509 |
| Fourth image-side surface 42 | -0.041783215 | 0.010264118 | -0.004182903 | 0.003187269 |
| Fifth object-side surface 51 | 0.176593912 | -0.115947718 | 0.039602331 | -0.005743837 |
| Fifth image-side surface 52 | 0.020651899 | -0.010475677 | 4.41639E-05 | 0.00033678 |
| Sixth object-side surface 61 | 0.000985736 | -0.000140882 | -1.41372E-06 | 1.02065E-06 |
| First object-side surface 11 | -1.16995E-05 | 4.35845E-06 | 3.01744E-07 | -8.16199E-08 |

FIG. 23

| Fourth Example | | | | | | |
|---|---|---|---|---|---|---|
| EFL(Effective Focal Length)= 3.696 mm., HFOV(Half Field Of View)= 39.85 deg., Total Length=5.034mm., Fno= 2.0 | | | | | | |
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.1800 | | | | |
| 11 | First Lens | 2.2445 | 0.5089 | 1.544 | 56.114 | 3.741 | Plastic |
| 12 | | -20.8684 | 0.1103 | | | | |
| 21 | Second Lens | 3.5951 | 0.2398 | 1.640 | 23.529 | -5.418 | Plastic |
| 22 | | 1.7251 | 0.3193 | | | | |
| 31 | Third Lens | 28.3363 | 0.5201 | 1.544 | 56.114 | 4.209 | Plastic |
| 32 | | -2.4847 | 0.0699 | | | | |
| 41 | Fourth Lens | -2.3664 | 0.3509 | 1.544 | 56.114 | -238.165 | Plastic |
| 42 | | -2.5365 | 0.5081 | | | | |
| 51 | Fifth Lens | -0.8357 | 0.3000 | 1.640 | 23.529 | -10.887 | Plastic |
| 52 | | -1.0821 | 0.1194 | | | | |
| 61 | Sixth Lens | 0.9948 | 0.5873 | 1.531 | 55.744 | 21.436 | Plastic |
| 62 | | 0.8660 | 0.5000 | | | | |
| 72 | Filter | infinity | 0.2100 | | | | |
| | Filter -Image Plane | infinity | 0.6898 | | | | |
| 71 | Image Plane | infinity | | | | | |

FIG. 24

| No. | K | a2 | a4 | a6 | a8 |
|---|---|---|---|---|---|
| First object-side surface 11 | -0.955223881 | 0 | 0.016507689 | -0.020043384 | 0.053637435 |
| First image-side surface 12 | -68.28073392 | 0 | -0.055097541 | 0.154354051 | -0.175265737 |
| Second object-side surface 21 | 0 | 0 | -0.269544664 | 0.366697993 | -0.292076334 |
| Second image-side surface 22 | -7.175780799 | 0 | -0.116089971 | 0.155849976 | -0.091807329 |
| Third object-side surface 31 | 0 | 0 | -0.095770663 | -0.040859209 | 0.056485905 |
| Third image-side surface 32 | 2.582237105 | 0 | -0.050329846 | -0.017605818 | 0.071603909 |
| Fourth object-side surface 41 | 2.47454915 | 0 | -0.006868455 | 0.037692749 | 0.077494942 |
| Fourth image-side surface 42 | 2.248716429 | 0 | -0.007365112 | 0.024492737 | 0.044172142 |
| Fifth object-side surface 51 | -6.397804292 | 0 | -0.356120289 | 0.309753245 | -0.192537203 |
| Fifth image-side surface 52 | -1.059495257 | 0 | 0.029918568 | -0.038297335 | 0.022672698 |
| Sixth object-side surface 61 | -6.706088789 | 0 | -0.086997384 | 0.012211216 | -0.002090821 |
| First object-side surface 11 | -4.130637935 | 0 | -0.060955093 | 0.011744057 | -0.002022787 |

| No. | a10 | a12 | a14 | a16 |
|---|---|---|---|---|
| First object-side surface 11 | -0.055489462 | -0.020272793 | 0.063666664 | -0.034442366 |
| First image-side surface 12 | 0.044400141 | 0.003130223 | 0 | 0 |
| Second object-side surface 21 | -0.023719499 | 0.059214978 | 0.052363265 | -0.030643513 |
| Second image-side surface 22 | -0.081182153 | 0.030286868 | 0.05945374 | -0.027587515 |
| Third object-side surface 31 | -0.032092485 | 0.024039266 | -0.001176921 | -0.004245856 |
| Third image-side surface 32 | -0.018187112 | 0.021345222 | -0.004432564 | -0.003960049 |
| Fourth object-side surface 41 | -0.049352973 | -0.00388169 | -0.007914952 | 0.009198673 |
| Fourth image-side surface 42 | -0.04328011 | 0.009668412 | -0.00440541 | 0.003118086 |
| Fifth object-side surface 51 | 0.175572106 | -0.116048875 | 0.039768983 | -0.005553148 |
| Fifth image-side surface 52 | 0.02101991 | -0.010497838 | 1.56023E-05 | 0.000319387 |
| Sixth object-side surface 61 | 0.00098783 | -0.000141945 | -1.68386E-06 | 9.92365E-07 |
| First object-side surface 11 | 0.000226164 | -1.70029E-05 | 1.50092E-06 | -1.00665E-07 |

FIG. 25

| | | | Fifth Example | | | | |
|---|---|---|---|---|---|---|---|
| | EFL(Effective Focal Length)= 3.690 mm., HFOV(Half Field Of View)= 39.11 deg., Total Length=4.958mm., Fno= 2.0 | | | | | | |
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.1800 | | | | |
| 11 | First Lens | 2.2341 | 0.5538 | 1.544 | 56.114 | 3.714 | Plastic |
| 12 | | -19.9969 | 0.0691 | | | | |
| 21 | Second Lens | 3.7366 | 0.3273 | 1.640 | 23.529 | -5.457 | Plastic |
| 22 | | 1.7496 | 0.2720 | | | | |
| 31 | Third Lens | 15.8873 | 0.4980 | 1.544 | 56.114 | 4.101 | Plastic |
| 32 | | -2.5772 | 0.0806 | | | | |
| 41 | Fourth Lens | -2.3606 | 0.3830 | 1.544 | 56.114 | -225.565 | Plastic |
| 42 | | -2.5446 | 0.3304 | | | | |
| 51 | Fifth Lens | -0.8063 | 0.2999 | 1.640 | 23.529 | -6.514 | Plastic |
| 52 | | -1.1433 | 0.0697 | | | | |
| 61 | Sixth Lens | 0.8467 | 0.5294 | 1.531 | 55.744 | 9.418 | Plastic |
| 62 | | 0.7972 | 0.5000 | | | | |
| 72 | Filter | infinity | 0.2100 | | | | |
| | Filter -Image Plane | infinity | 0.8353 | | | | |
| 71 | Image Plane | infinity | | | | | |

FIG. 26

| No. | K | a2 | a4 | a6 | a8 |
|---|---|---|---|---|---|
| First object-side surface 11 | -0.715406459 | 0 | 0.019781749 | -0.019634139 | 0.050449704 |
| First image-side surface 12 | 134.4758413 | 0 | -0.057614969 | 0.154656707 | -0.183912291 |
| Second object-side surface 21 | 0 | 0 | -0.27023526 | 0.354984726 | -0.293047088 |
| Second image-side surface 22 | -6.395714298 | 0 | -0.132777307 | 0.160467951 | -0.086466005 |
| Third object-side surface 31 | 0 | 0 | -0.115585352 | -0.026127769 | 0.061277413 |
| Third image-side surface 32 | 2.554219048 | 0 | -0.059563995 | -0.01885867 | 0.076643443 |
| Fourth object-side surface 41 | 2.452000972 | 0 | 0.015618743 | 0.041912356 | 0.073295949 |
| Fourth image-side surface 42 | 2.311559818 | 0 | -0.00420717 | 0.026358744 | 0.045743772 |
| Fifth object-side surface 51 | -7.929951533 | 0 | -0.354811442 | 0.307740338 | -0.193492735 |
| Fifth image-side surface 52 | -1.173001615 | 0 | 0.036555637 | -0.039613871 | 0.021972614 |
| Sixth object-side surface 61 | -6.233093166 | 0 | -0.094382943 | 0.012842272 | -0.001967429 |
| First object-side surface 11 | -4.042519114 | 0 | -0.068469574 | 0.013233326 | -0.002067901 |

| No. | a10 | a12 | a14 | a16 |
|---|---|---|---|---|
| First object-side surface 11 | -0.055741195 | -0.01859392 | 0.06528506 | -0.034142985 |
| First image-side surface 12 | 0.042415943 | 0.017867096 | 0 | 0 |
| Second object-side surface 21 | -0.016566791 | 0.066694873 | 0.055121558 | -0.034434209 |
| Second image-side surface 22 | -0.081067934 | 0.028945138 | 0.059096718 | -0.026677929 |
| Third object-side surface 31 | -0.030113082 | 0.025278414 | -0.000692567 | -0.004370841 |
| Third image-side surface 32 | -0.015244896 | 0.02252596 | -0.004167024 | -0.004087708 |
| Fourth object-side surface 41 | -0.050999305 | -0.003788872 | -0.007297374 | 0.009871547 |
| Fourth image-side surface 42 | -0.043051594 | 0.009525491 | -0.004437566 | 0.003190939 |
| Fifth object-side surface 51 | 0.17559902 | -0.115895293 | 0.039823441 | -0.005556085 |
| Fifth image-side surface 52 | 0.02090065 | -0.010497431 | 2.7506E-05 | 0.000337292 |
| Sixth object-side surface 61 | 0.000998846 | -0.000141731 | -1.83249E-06 | 9.52781E-07 |
| First object-side surface 11 | 0.000202278 | -1.88761E-05 | 1.58432E-06 | -4.62858E-08 |

FIG. 27

| Sixth Example |||||||
|---|---|---|---|---|---|---|
| EFL(Effective Focal Length)= 3.677 mm., HFOV(Half Field Of View)= 39.21 deg., Total Length=4.903mm., Fno= 2.0 |||||||
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.1800 | | | | |
| 11 | First Lens | 2.1252 | 0.5068 | 1.544 | 56.114 | 3.850 | Plastic |
| 12 | | -176.5140 | 0.1434 | | | | |
| 21 | Second Lens | 3.8501 | 0.2398 | 1.640 | 23.529 | -5.352 | Plastic |
| 22 | | 1.7752 | 0.2463 | | | | |
| 31 | Third Lens | 13.9073 | 0.4824 | 1.544 | 56.114 | 4.027 | Plastic |
| 32 | | -2.5790 | 0.1596 | | | | |
| 41 | Fourth Lens | -2.3696 | 0.3414 | 1.544 | 56.114 | -196.524 | Plastic |
| 42 | | -2.5464 | 0.3973 | | | | |
| 51 | Fifth Lens | -0.8010 | 0.3105 | 1.640 | 23.529 | -6.743 | Plastic |
| 52 | | -1.1311 | 0.0699 | | | | |
| 61 | Sixth Lens | 0.8461 | 0.5434 | 1.531 | 55.744 | 9.026 | Plastic |
| 62 | | 0.7975 | 0.5000 | | | | |
| 72 | Filter | infinity | 0.2100 | | | | |
| | Filter -Image Plane | infinity | 0.7521 | | | | |
| 71 | Image Plane | infinity | | | | | |

FIG. 28

| No. | K | a2 | a4 | a6 | a8 |
|---|---|---|---|---|---|
| First object-side surface 11 | -0.810184603 | 0 | 0.018370249 | -0.020185545 | 0.0495186 |
| First image-side surface 12 | 3067.053244 | 0 | -0.058404758 | 0.153828763 | -0.184259926 |
| Second object-side surface 21 | 0 | 0 | -0.271437679 | 0.355014446 | -0.292717727 |
| Second image-side surface 22 | -6.95649677 | 0 | -0.133809136 | 0.159196707 | -0.087464976 |
| Third object-side surface 31 | 0 | 0 | -0.114386985 | -0.024735765 | 0.061919661 |
| Third image-side surface 32 | 2.526745853 | 0 | -0.055529145 | -0.018494929 | 0.076438097 |
| Fourth object-side surface 41 | 2.447753494 | 0 | 0.007693323 | 0.040142848 | 0.073783087 |
| Fourth image-side surface 42 | 2.304932387 | 0 | -0.002562223 | 0.028655967 | 0.046380481 |
| Fifth object-side surface 51 | -7.740164587 | 0 | -0.352656238 | 0.307183023 | -0.193873969 |
| Fifth image-side surface 52 | -1.097211575 | 0 | 0.031732603 | -0.039891399 | 0.021929978 |
| Sixth object-side surface 61 | -6.288579396 | 0 | -0.09473869 | 0.012820547 | -0.00196778 |
| First object-side surface 11 | -3.983141432 | 0 | -0.069193225 | 0.013133706 | -0.002045283 |

| No. | a10 | a12 | a14 | a16 |
|---|---|---|---|---|
| First object-side surface 11 | -0.056634669 | -0.019091113 | 0.065344057 | -0.033412581 |
| First image-side surface 12 | 0.042081557 | 0.017528549 | 0 | 0 |
| Second object-side surface 21 | -0.016275528 | 0.066778503 | 0.05508828 | -0.03450301 |
| Second image-side surface 22 | -0.081530891 | 0.028821624 | 0.059127868 | -0.026600638 |
| Third object-side surface 31 | -0.029997699 | 0.025165541 | -0.000864221 | -0.004532879 |
| Third image-side surface 32 | -0.015293877 | 0.02258884 | -0.004082181 | -0.004016437 |
| Fourth object-side surface 41 | -0.050573578 | -0.003649856 | -0.007296931 | 0.009837467 |
| Fourth image-side surface 42 | -0.042985605 | 0.009506965 | -0.004447625 | 0.003191654 |
| Fifth object-side surface 51 | 0.175471515 | -0.115942734 | 0.039782723 | -0.00559249 |
| Fifth image-side surface 52 | 0.020802203 | -0.010527829 | 1.86409E-05 | 0.000334617 |
| Sixth object-side surface 61 | 0.000999215 | -0.000141604 | -1.80278E-06 | 9.58014E-07 |
| First object-side surface 11 | 0.000206556 | -1.84352E-05 | 1.61149E-06 | -4.68569E-08 |

FIG. 29

| Seventh Example |||||||
|---|---|---|---|---|---|---|
| EFL(Effective Focal Length)= 3.735 mm., HFOV(Half Field Of View)= 38.81 deg., Total Length=4.982mm., Fno= 2.0 |||||||
| No. | | Curvature Radius | Ape. Stop Distance Lens Thickness Air Gap | Refractive Index | Abbe No. | Focal Length | Material |
| | Object | infinity | infinity | | | | |
| 80 | Ape. Stop | infinity | -0.1800 | | | | |
| 11 | First Lens | 2.1892 | 0.5536 | 1.544 | 56.114 | 3.821 | Plastic |
| 12 | | -40.2400 | 0.1070 | | | | |
| 21 | Second Lens | 3.6028 | 0.2398 | 1.640 | 23.529 | -5.591 | Plastic |
| 22 | | 1.7546 | 0.2778 | | | | |
| 31 | Third Lens | 16.8362 | 0.4800 | 1.544 | 56.114 | 4.109 | Plastic |
| 32 | | -2.5623 | 0.1165 | | | | |
| 41 | Fourth Lens | -2.3681 | 0.3526 | 1.544 | 56.114 | -197.563 | Plastic |
| 42 | | -2.5485 | 0.2759 | | | | |
| 51 | Fifth Lens | -0.8325 | 0.3000 | 1.640 | 23.529 | -6.932 | Plastic |
| 52 | | -1.1677 | 0.1843 | | | | |
| 61 | Sixth Lens | 0.8458 | 0.5363 | 1.531 | 55.744 | 10.219 | Plastic |
| 62 | | 0.7806 | 0.5000 | | | | |
| 72 | Filter | infinity | 0.2100 | | | | |
| | Filter -Image Plane | infinity | 0.8486 | | | | |
| 71 | Image Plane | infinity | | | | | |

FIG. 30

| No. | K | a2 | a4 | a6 | a8 |
|---|---|---|---|---|---|
| First object-side surface 11 | -0.843070468 | 0 | 0.017919175 | -0.01993191 | 0.050289747 |
| First image-side surface 12 | 0 | 0 | -0.055164085 | 0.153765933 | -0.184952282 |
| Second object-side surface 21 | 0 | 0 | -0.269863836 | 0.355632658 | -0.292916586 |
| Second image-side surface 22 | -6.689682849 | 0 | -0.13311826 | 0.160920379 | -0.085930323 |
| Third object-side surface 31 | 0 | 0 | -0.116166627 | -0.025687988 | 0.061366914 |
| Third image-side surface 32 | 2.552981515 | 0 | -0.056264789 | -0.018857874 | 0.076701718 |
| Fourth object-side surface 41 | 2.449597844 | 0 | 0.007847729 | 0.040926017 | 0.072618731 |
| Fourth image-side surface 42 | 2.293701699 | 0 | -0.007818575 | 0.025581686 | 0.045544835 |
| Fifth object-side surface 51 | -7.99516143 | 0 | -0.348589525 | 0.30876449 | -0.193289105 |
| Fifth image-side surface 52 | -1.133536339 | 0 | 0.034390674 | -0.039168765 | 0.022087992 |
| Sixth object-side surface 61 | -6.545502129 | 0 | -0.098280153 | 0.01246869 | -0.002050004 |
| First object-side surface 11 | -4.29792901 | 0 | -0.067897548 | 0.012351848 | -0.002008937 |

| No. | a10 | a12 | a14 | a16 |
|---|---|---|---|---|
| First object-side surface 11 | -0.055846154 | -0.018587364 | 0.065424366 | -0.033852965 |
| First image-side surface 12 | 0.041519299 | 0.017195166 | 0 | 0 |
| Second object-side surface 21 | -0.016616058 | 0.066566226 | 0.054979539 | -0.034591571 |
| Second image-side surface 22 | -0.08069231 | 0.029179274 | 0.059274782 | -0.026571672 |
| Third object-side surface 31 | -0.030129267 | 0.025253612 | -0.000714659 | -0.004399243 |
| Third image-side surface 32 | -0.015189141 | 0.022522031 | -0.004210674 | -0.004140265 |
| Fourth object-side surface 41 | -0.051400883 | -0.003939817 | -0.007300659 | 0.009935587 |
| Fourth image-side surface 42 | -0.043136304 | 0.009493444 | -0.00444578 | 0.003191728 |
| Fifth object-side surface 51 | 0.175652936 | -0.115871686 | 0.039825902 | -0.005559469 |
| Fifth image-side surface 52 | 0.020842092 | -0.010514652 | 2.17507E-05 | 0.000336839 |
| Sixth object-side surface 61 | 0.000992444 | -0.000139303 | 1.34497E-06 | 3.89144E-07 |
| First object-side surface 11 | 0.000231417 | -1.50336E-05 | 2.26151E-07 | -2.27833E-08 |

FIG. 31

|  | Example 1 | Example 2 | Example 3 | Example 4 | Example 5 | Example 6 | Example 7 |
|---|---|---|---|---|---|---|---|
| T1/AG45 | 1.996 | 1.382 | 1.582 | 1.002 | 1.676 | 1.276 | 2.007 |
| T6/T2 | 2.226 | 3.492 | 2.268 | 2.449 | 1.617 | 2.266 | 2.237 |
| T5/T2 | 1.278 | 1.269 | 1.896 | 1.251 | 0.916 | 1.295 | 1.251 |
| AAG/T2 | 3.722 | 3.935 | 3.603 | 4.699 | 2.511 | 4.239 | 4.010 |
| AG23/(AG12+AG34) | 1.553 | 1.664 | 1.610 | 1.772 | 1.816 | 0.813 | 1.243 |
| AAG/(AG12+AG56) | 4.932 | 5.148 | 5.089 | 4.907 | 5.921 | 4.765 | 3.301 |
| (AG34+AG56)/AG23 | 0.698 | 0.459 | 0.520 | 0.593 | 0.553 | 0.932 | 1.083 |
| AAG/T6 | 1.672 | 1.127 | 1.588 | 1.919 | 1.552 | 1.871 | 1.793 |
| T1/T3 | 1.377 | 1.094 | 0.847 | 0.978 | 1.112 | 1.051 | 1.153 |
| T4/AG23 | 1.338 | 1.238 | 1.063 | 1.099 | 1.408 | 1.386 | 1.269 |
| AAG/(AG12+AG34) | 4.975 | 5.178 | 4.698 | 6.253 | 5.489 | 3.354 | 4.302 |
| ALT/T4 | 7.004 | 7.414 | 8.379 | 7.145 | 6.767 | 7.101 | 6.984 |
| T6/AG23 | 1.916 | 2.762 | 1.838 | 1.839 | 1.946 | 2.206 | 1.931 |
| T3/T5 | 1.590 | 1.610 | 1.291 | 1.734 | 1.661 | 1.554 | 1.600 |
| ALT/T5 | 8.521 | 9.145 | 5.801 | 8.358 | 8.642 | 7.808 | 8.208 |
| T5/T4 | 0.822 | 0.811 | 1.444 | 0.855 | 0.783 | 0.909 | 0.851 |
| AAG/T4 | 2.394 | 2.514 | 2.745 | 3.212 | 2.146 | 2.978 | 2.727 |

FIG. 32

OPTICAL IMAGING LENS AND ELECTRONIC DEVICE COMPRISING THE SAME

CROSS REFERENCE TO RELATED APPLICATION

This application claims priority to Chinese Application No. 201410383432.5, filed on Aug. 6, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of six lens elements and an electronic device which includes such optical imaging lens set.

2. Description of the Prior Art

In recent years, the popularity of mobile phones and digital cameras makes the sizes of various portable electronic products reduce quickly, and so does the size of the photography modules. The current trend of research is to develop an optical imaging lens set of a shorter length with uncompromised good quality. The most important characteristics of an optical imaging lens set are image quality and size.

U.S. Pat. No. 7,830,620 discloses an optical imaging lens set of six lens elements. However, in U.S. Pat. No. 7,830,620, the first lens element has negative refractive power, the second lens element has positive refractive power, and the aperture stop is disposed between the second lens element and the third lens element. This arrangement cannot achieve good optical performance. Besides, the size of the optical imaging lens set is too big to satisfy the specification requirements of consumer electronics products.

Therefore, how to reduce the total length of a photographic device, but still maintain good optical performance, is an important research objective.

SUMMARY OF THE INVENTION

In the light of the above, the present invention is capable of proposing an optical imaging lens set that is lightweight, and has a low production cost, reduced length, high resolution and high image quality. The optical imaging lens set of six lens elements of the present invention has an aperture stop, a first lens element, a second lens element, a third lens element, a fourth lens element, a fifth lens element, and a sixth lens element sequentially from an object side to an image side along an optical axis.

An optical imaging lens includes: a first, second, third, fourth, fifth and sixth lens element, the first lens element has a positive refracting power, an object-side surface is a convex surface, having a convex part in a vicinity of the optical axis, and a convex part in a vicinity of its periphery, the second lens element has a negative refracting power and an object-side surface with a concave part in a vicinity of its periphery, the third lens element has an object-side surface with a concave part in a vicinity of its periphery, and an image-side surface with a convex part in a vicinity of the optical axis, the fourth lens has an image-side surface with a convex part in a vicinity of the optical axis, the fifth lens element has object-side surface with a concave part in a vicinity of its periphery, and an image-side surface with a convex part in a vicinity of the optical axis, the sixth lens element has an image-side surface with a convex part in a vicinity of its periphery, wherein the optical imaging lens set does not include any lens element with refractive power other than said first, second, third, fourth, fifth lens elements and sixth lens element.

In the optical imaging lens set of six lens elements of the present invention, an air gap AG12 along the optical axis is disposed between the first lens element and the second lens element, an air gap AG23 along the optical axis is disposed between the second lens element and the third lens element, an air gap AG34 along the optical axis is disposed between the third lens element and the fourth lens element, an air gap AG45 along the optical axis is disposed between the fourth lens element and the fifth lens element, an air gap AG56 along the optical axis is disposed between the fifth lens element and the sixth lens element, and the sum of total five air gaps between adjacent lens elements from the first lens element to the sixth lens element along the optical axis is AAG, $AAG=AG12+AG23+AG34+AG45+AG56$.

In the optical imaging lens set of six lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, the sixth lens element has a sixth lens element thickness T6 along the optical axis, and the total thickness of all the lens elements in the optical imaging lens set along the optical axis is ALT, $ALT=T1+T2+T3+T4+T5+T6$.

In the optical imaging lens set of six lens elements of the present invention, the relationship $T1/AG45 \leq 2.1$ is satisfied.

In the optical imaging lens set of six lens elements of the present invention, the relationship $T6/T2 \leq 3.5$ is satisfied.

In the optical imaging lens set of six lens elements of the present invention, the relationship $3.0 \leq AAG/(AG12+AG56)$ is satisfied.

In the optical imaging lens set of six lens elements of the present invention, the relationship $(AG34+AG56)/AG23 \leq 1.2$ is satisfied.

In the optical imaging lens set of six lens elements of the present invention, the relationship $AAG/T6 \leq 2.0$ is satisfied.

In the optical imaging lens set of six lens elements of the present invention, the relationship $T5/T2 \leq 2.0$ is satisfied.

In the optical imaging lens set of six lens elements of the present invention, the relationship $T1/T3 \leq 1.4$ is satisfied.

In the optical imaging lens set of six lens elements of the present invention, the relationship $1.0 \leq T4/AG23$ is satisfied.

In the optical imaging lens set of six lens elements of the present invention, the relationship $AAG/(AG12+AG34) \leq 6.5$ is satisfied.

In the optical imaging lens set of six lens elements of the present invention, the relationship $AAG/T2 \leq 4.8$ is satisfied.

In the optical imaging lens set of six lens elements of the present invention, the relationship $ALT/T4 \leq 9.0$ is satisfied.

In the optical imaging lens set of six lens elements of the present invention, the relationship $T6/AG23 \leq 2.8$ is satisfied.

In the optical imaging lens set of six lens elements of the present invention, the relationship $1.2 \leq T3/T5$ is satisfied.

In the optical imaging lens set of six lens elements of the present invention, the relationship $AG23/(AG12+AG34) \leq 1.85$ is satisfied.

In the optical imaging lens set of six lens elements of the present invention, the relationship $5.0 \leq ALT/T5$ is satisfied.

In the optical imaging lens set of six lens elements of the present invention, the relationship T5/T4≤1.5 is satisfied.

In the optical imaging lens set of six lens elements of the present invention, the relationship AAG/T4≤3.3 is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION

Figure 15:
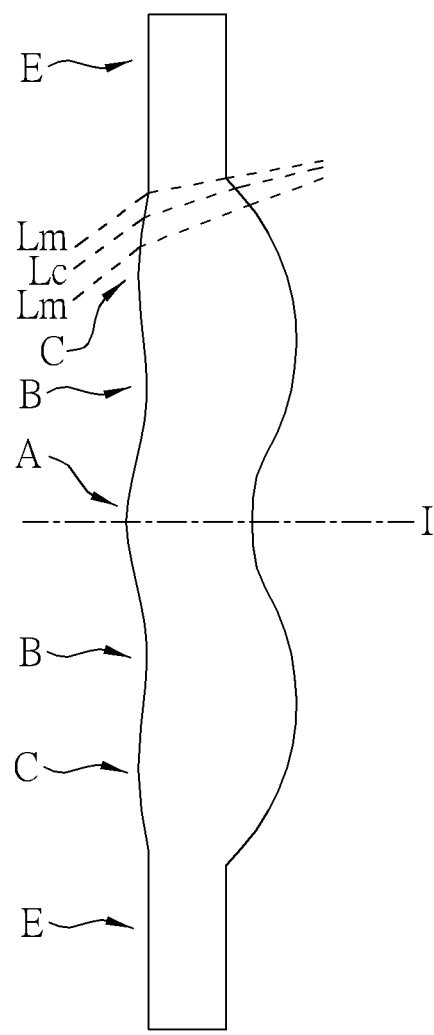
FIG. 15 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 15 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

Figure 1:
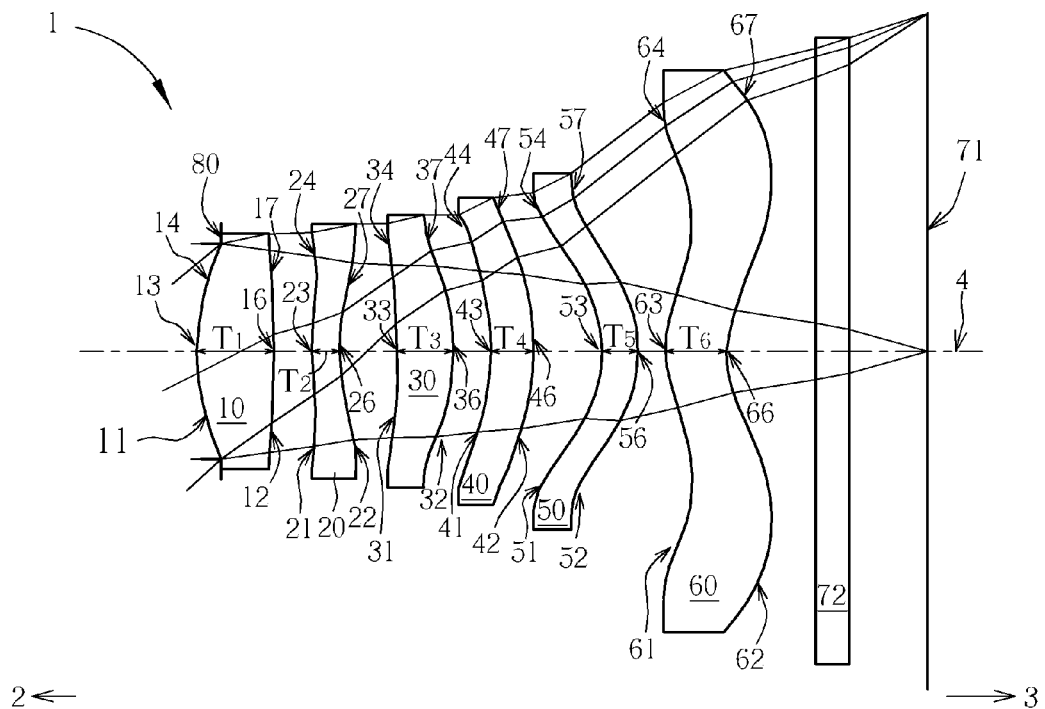
FIG. 1 illustrates a first example of the optical imaging lens set of the present invention.

As shown in FIG. 1, the optical imaging lens set 1 of six lens elements of the present invention, sequentially located from an object side 2 (where an object is located) to an image side 3 along an optical axis 4, has an aperture stop 80, a first lens element 10, a second lens element 20, a third lens element 30, a fourth lens element 40, a fifth lens element 50, a sixth lens element 60, a filter 72 and an image plane 71. Generally speaking, the first lens element 10, the second lens element 20, the third lens element 30, the fifth lens element 50 and the sixth lens element 60 may be made of a transparent plastic material and each has an appropriate refractive power. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 72.

In the embodiments of the present invention, the optional filter 72 may be a filter of various suitable functions, for example, the filter 72 may be an infrared cut filter (IR cut filter), placed between the sixth lens element 60 and the image plane 71. The filter 72 is made of glass, without affecting the focal length of the optical lens element system, namely the optical imaging lens set, of the present invention.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; and the sixth lens element 60 has a sixth object-side surface 61 and a sixth image-side surface 62.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, and the sixth lens element 60 has a sixth lens element thickness T6. Therefore, the total thickness of all the lens elements in the optical imaging lens set 1 along the optical axis 4 is ALT=T1+T2+T3+T4+T5+T6.

In addition, between two adjacent lens elements in the optical imaging lens set 1 of the present invention there is an air gap along the optical axis 4. For example, an air gap AG12 is disposed between the first lens element 10 and the second lens element 20, an air gap AG23 is disposed between the second lens element 20 and the third lens element 30, an air gap AG34 is disposed between the third lens element 30 and the fourth lens element 40, an air gap AG45 is disposed between the fourth lens element 40 and the fifth lens element 50, and an air gap AG56 is disposed between the fifth lens element 50 and the sixth lens element 60. Therefore, the sum of total five air gaps between adjacent lens elements from the first lens element 10 to the sixth lens element 60 along the optical axis 4 is AAG, AAG=AG12+AG23+AG34+AG45+AG56.

First Example

Figures 2A, 2B, 2C, 2D:
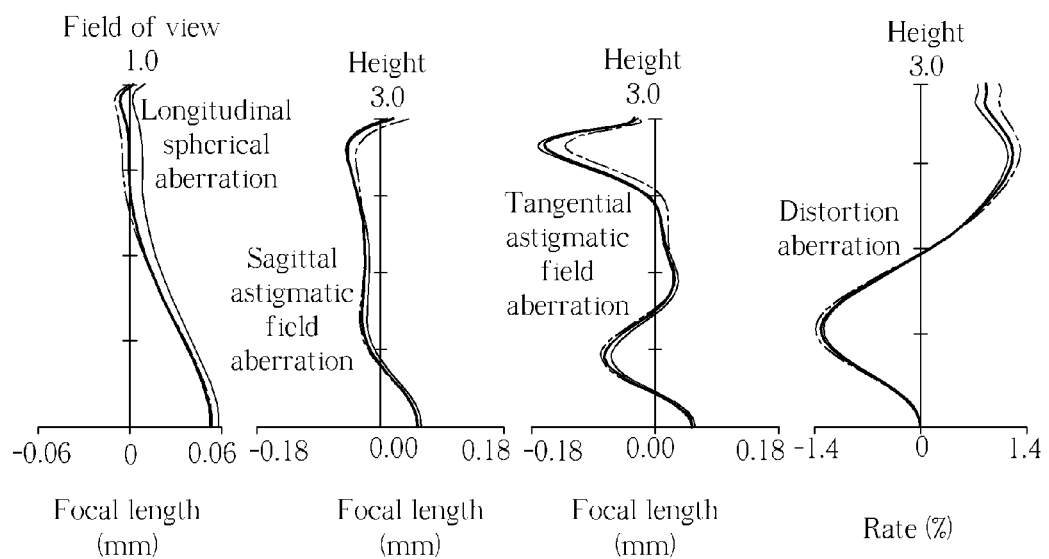
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 3.085 mm.

The optical imaging lens set 1 of the first example has six lens elements 10 to 60; all of the lens elements are made of a plastic material and have refractive power. The optical imaging lens set 1 also has an aperture stop 80, a filter 72, and an image plane 71. The aperture stop 80 is provided between the object side 2 and the first lens element 10. The filter 72 may be used for preventing specific wavelength light (such as the Infrared light) reaching the image plane to adversely affect the imaging quality.

The first lens element 10 has positive refractive power. The first object-side surface 11 facing toward the object side 2 is a convex surface, having a convex part 13 in the vicinity of the optical axis and a convex part 14 in a vicinity of its circular periphery; The first image-side surface 12 facing toward the image side 3 is a convex surface, having a convex part 16 in the vicinity of the optical axis and a convex part 17 in a vicinity of its circular periphery.

The second lens element 20 has negative refractive power. The second object-side surface 21 facing toward the object side 2 has a convex part 23 in the vicinity of the optical axis and a concave part 24 in a vicinity of its circular periphery. The second image-side surface 22 facing toward the image side 3 is a concave surface, having a concave part 26 in the vicinity of the optical axis and a concave part 27 in a vicinity of its circular periphery.

The third lens element 30 has positive refractive power. The third object-side surface 31 facing toward the object side 2 has a convex part 33 in the vicinity of the optical axis and a concave part 34 in a vicinity of its circular periphery; The third image-side surface 32 facing toward the image side 3 has a convex part 36 in the vicinity of the optical axis and a concave part 37 in a vicinity of its circular periphery.

The fourth lens element 40 has negative refractive power. The fourth object-side surface 41 facing toward the object side 2 has a concave part 43 in the vicinity of the optical axis and a concave part 44 in a vicinity of its circular periphery; the fourth image-side surface 42 facing toward the image side 3 has a convex part 46 in the vicinity of the optical axis and a convex part 47 in a vicinity of its circular periphery The fifth lens element 50 has negative refractive power. The fifth object-side surface 51 facing toward the object side 2 is a concave surface, having a concave part 53 in the vicinity of the optical axis and a concave part 54 in a vicinity of its circular periphery; The fifth image-side surface 52 facing toward the image side 3 is a convex surface, having a convex part 56 in the vicinity of the optical axis and a convex part 57 in a vicinity of its circular periphery.

The sixth lens element 60 has positive refractive power. The sixth object-side surface 61 facing toward the object side 2 has a convex part 63 in the vicinity of the optical axis and a concave part 64 in a vicinity of its circular periphery; The sixth image-side surface 62 facing toward the image side 3 has a concave part 66 in the vicinity of the optical axis and a convex part 67 in a vicinity of its circular periphery. The filter 72 may be disposed between the sixth lens element 60 and the image plane 71.

In the optical imaging lens element 1 of the present invention, the object-side surfaces 11/21/31/41/51/61 and image-side surfaces 12/22/32/42/52/62 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant;

$a_{2i}$ is the aspheric coefficient of the 2i order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.978 mm. The image height is 3.0 mm, HFOV is 38.86 degrees. Some important ratios of the first example are as follows:

T1/AG45=1.996
T6/T2=2.226
T5/T2=1.278
AAG/T2=3.722
AG23/(AG12+AG34)=1.553
AAG/(AG12+AG56)=4.932
(AG34+AG56)/AG23=0.698
AAG/T6=1.672
T1/T3=1.377
T4/AG23=1.338
AAG/(AG12+AG34)=4.975
ALT/T4=7.004
T6/AG23=1.916
T3/T5=1.590
ALT/T5=8.521
T5/T4=0.822
AAG/T4=2.394

Second Example

Figure 3:
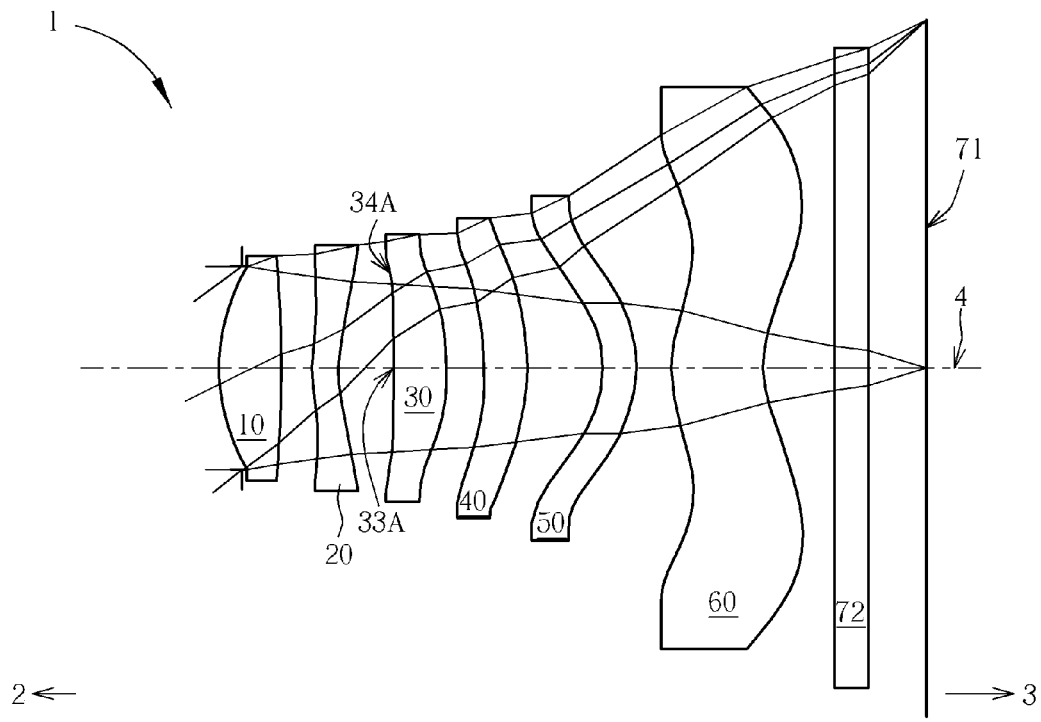
FIG. 3 illustrates a second example of the optical imaging lens set of six lens elements of the present invention.
Figures 4A, 4B, 4C, 4D:
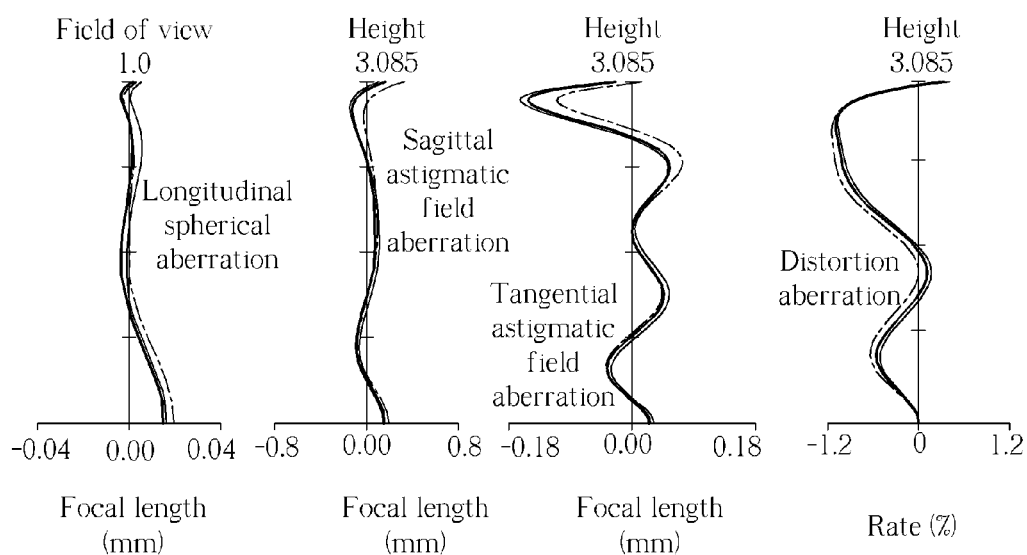
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. It is noted that from the second example to the following examples, in order to simplify the figures, only the components different from what the first example has and the basic lens elements will be labeled in figures. Others components that are the same as what the first example has, such as the object-side surface, the image-side surface, the part in a vicinity of the optical axis and the part in a vicinity of its circular periphery will be omitted in the following example. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33A in the vicinity of the optical axis and a concave part 34A in a vicinity of its circular periphery. The optical data of the second example of the optical imaging lens set are shown in FIG. 20 while the aspheric surface data are shown in FIG. 21. The length of the optical imaging lens set is 5.052 mm. The image height is 3.085 mm, HFOV is 40.00 degrees. Some important ratios of the second example are as follows:
T1/AG45=1.382
T6/T2=3.492
T5/T2=1.269
AAG/T2=3.935
AG23/(AG12+AG34)=1.664
AAG/(AG12+AG56)=5.148
(AG34+AG56)/AG23=0.459
AAG/T6=1.127
T1/T3=1.094
T4/AG23=1.238
AAG/(AG12+AG34)=5.178
ALT/T4=7.414
T6/AG23=2.762
T3/T5=1.610
ALT/T5=9.145
T5/T4=0.811
AAG/T4=2.514

Third Example

Figure 5:
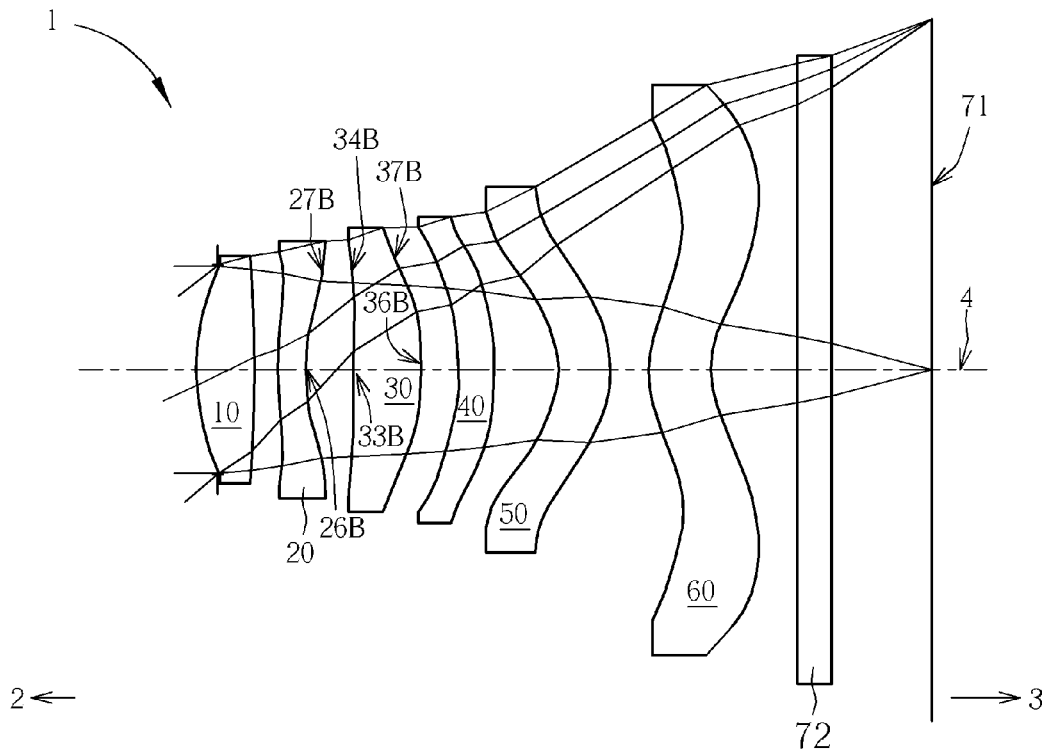
FIG. 5 illustrates a third example of the optical imaging lens set of six lens elements of the present invention.
Figures 6A, 6B, 6C, 6D:
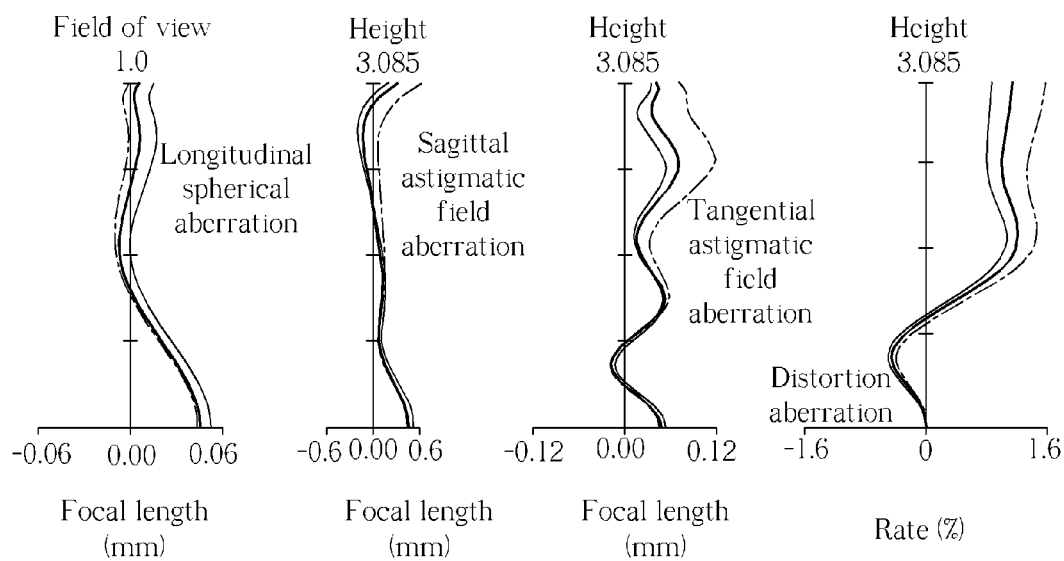
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the second image-side surface 22 of the second lens element 20 has a concave part 26B in the vicinity of the optical axis and a convex part 27B in a vicinity of its circular periphery; the third object-side surface 31 of the third lens element 30 has a convex part 33B in the vicinity of the optical axis and a concave part 34B in a vicinity of its circular periphery; the third image-side surface 32 of the third lens element 30 is a convex surface, having a convex part 36B in the vicinity of the optical axis and a convex part 37B in a vicinity of its circular periphery. The optical data of the third example of the optical imaging lens set are shown in FIG. 22 while the aspheric surface data are shown in FIG. 23. The length of the optical imaging lens set is 5.171 mm. The image height is 3.085 mm, HFOV is 39.99 degrees. Some important ratios of the third example are as follows:
T1/AG45=1.582
T6/T2=2.268
T5/T2=1.896
AAG/T2=3.603
AG23/(AG12+AG34)=1.610
AAG/(AG12+AG56)=5.089
(AG34+AG56)/AG23=0.520
AAG/T6=1.588
T1/T3=0.847
T4/AG23=1.063
AAG/(AG12+AG34)=4.698
ALT/T4=8.379
T6/AG23=1.838
T3/T5=1.291
ALT/T5=5.801
T5/T4=1.444

AAG/T4=2.745

Fourth Example

Figure 7:
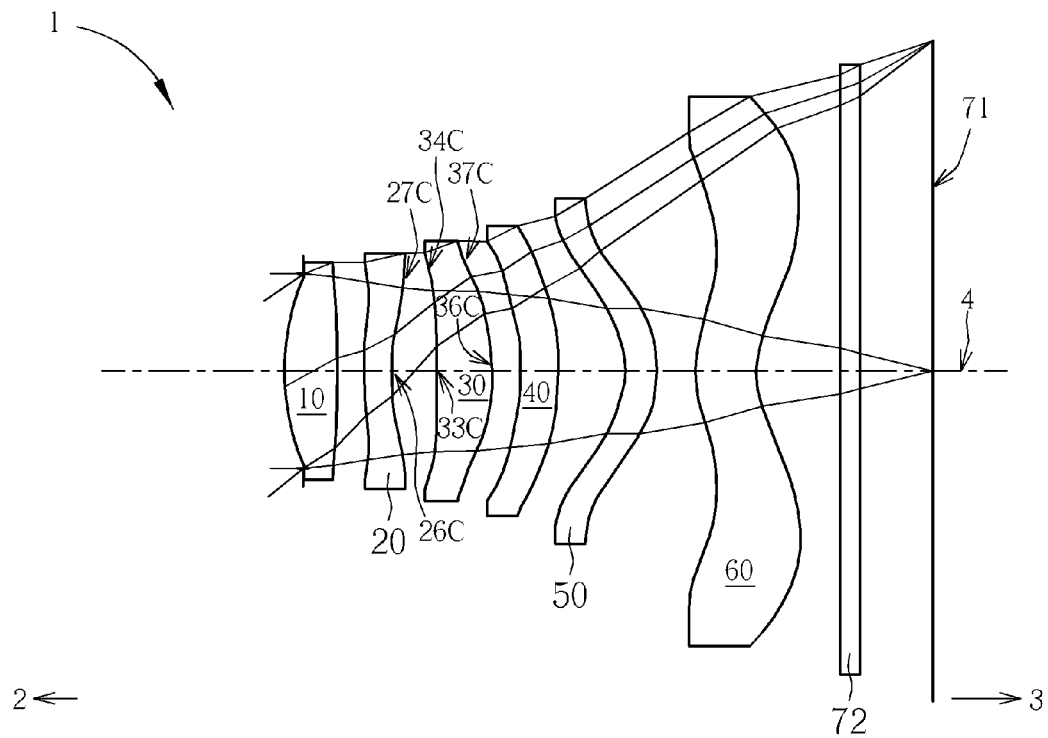
FIG. 7 illustrates a fourth example of the optical imaging lens set of six lens elements of the present invention.
Figure 8A:
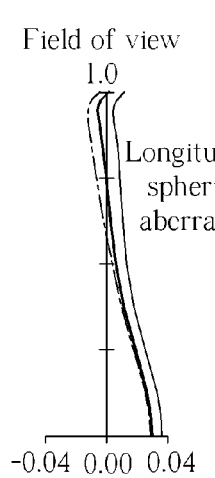
FIG. 8A illustrates the longitudinal spherical aberration on the image plane of the fourth example.
Figure 8B:
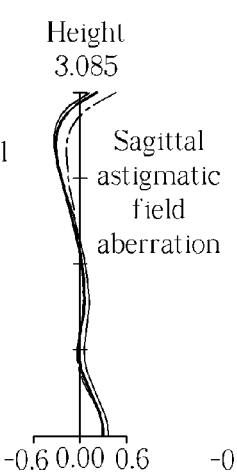
FIG. 8B illustrates the astigmatic aberration on the sagittal direction of the fourth example.
Figure 8C:
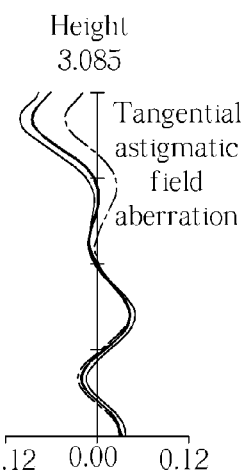
FIG. 8C illustrates the astigmatic aberration on the tangential direction of the fourth example.
Figure 8D:
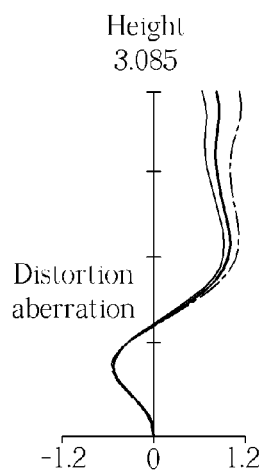
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the second image-side surface 22 of the second lens element 20 has a concave part 26C in the vicinity of the optical axis and a convex part 27C in a vicinity of its circular periphery; the third object-side surface 31 of the third lens element 30 has a convex part 33C in the vicinity of the optical axis and a concave part 34C in a vicinity of its circular periphery; the third image-side surface 32 of the third lens element 30 is a convex surface, having a convex part 36C in the vicinity of the optical axis and a convex part 37C in a vicinity of its circular periphery. The optical data of the fourth example of the optical imaging lens set are shown in FIG. 24 while the aspheric surface data are shown in FIG. 25. The length of the optical imaging lens set is 5.034 mm. The image height is 3.085 mm, HFOV is 39.85 degrees. Some important ratios of the fourth example are as follows:
T1/AG45=1.002
T6/T2=2.449
T5/T2=1.251
AAG/T2=4.699
AG23/(AG12+AG34)=1.772
AAG/(AG12+AG56)=4.907
(AG34+AG56)/AG23=0.593
AAG/T6=1.919
T1/T3=0.978
T4/AG23=1.099
AAG/(AG12+AG34)=6.253
ALT/T4=7.145
T6/AG23=1.839
T3/T5=1.734
ALT/T5=8.358
T5/T4=0.855
AAG/T4=3.212

Fifth Example

Figure 9:
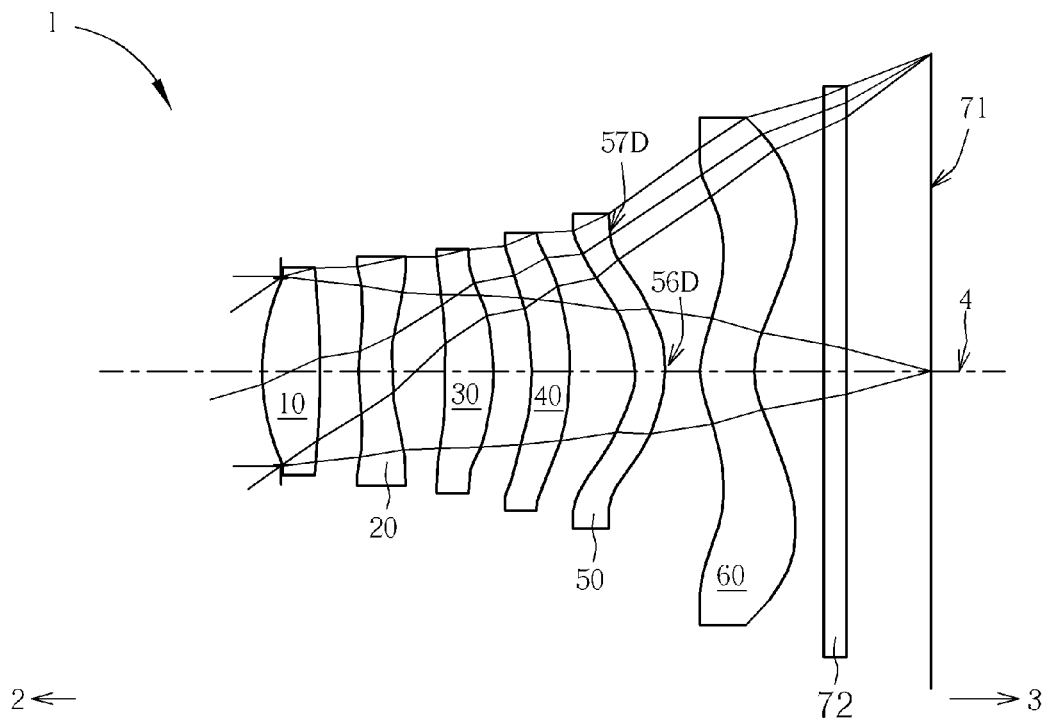
FIG. 9 illustrates a fifth example of the optical imaging lens set of six lens elements of the present invention.
Figures 10A, 10B, 10C, 10D:
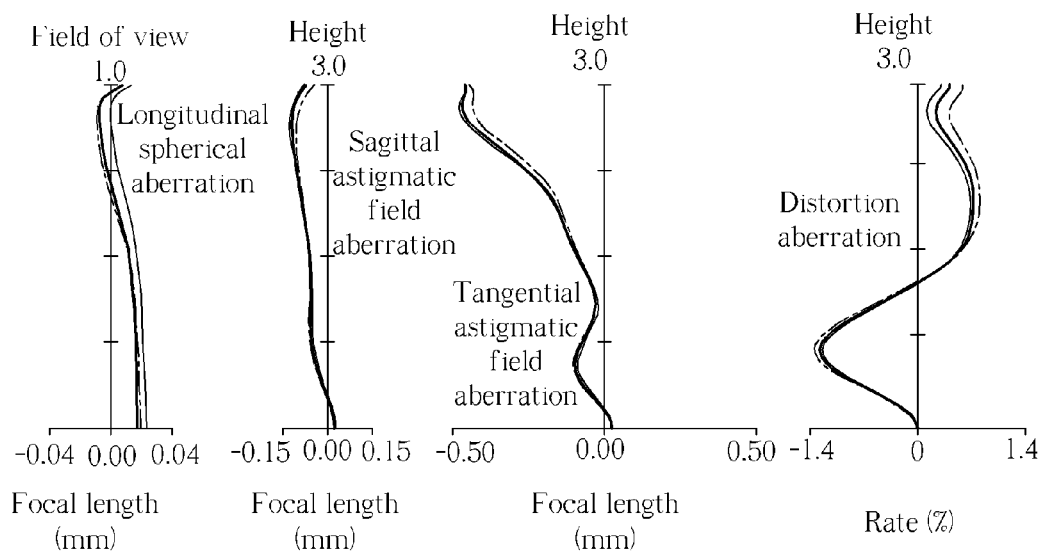
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the fifth image-side surface 52 of the fifth lens element 50 has a convex part 56D in the vicinity of the optical axis and a concave part 57D in a vicinity of its circular periphery. The optical data of the fifth example of the optical imaging lens set are shown in FIG. 26 while the aspheric surface data are shown in FIG. 27. The length of the optical imaging lens set is 4.958 mm. The image height is 3.0 mm, HFOV is 39.11 degrees. Some important ratios of the fifth example are as follows:
T1/AG45=1.676
T6/T2=1.617
T5/T2=0.916
AAG/T2=2.511
AG23/(AG12+AG34)=1.816
AAG/(AG12+AG56)=5.921
(AG34+AG56)/AG23=0.553
AAG/T6=1.552
T1/T3=1.112
T4/AG23=1.408
AAG/(AG12+AG34)=5.489
ALT/T4=6.767
T6/AG23=1.946
T3/T5=1.661
ALT/T5=8.642
T5/T4=0.783
AAG/T4=2.146

Sixth Example

Figure 11:
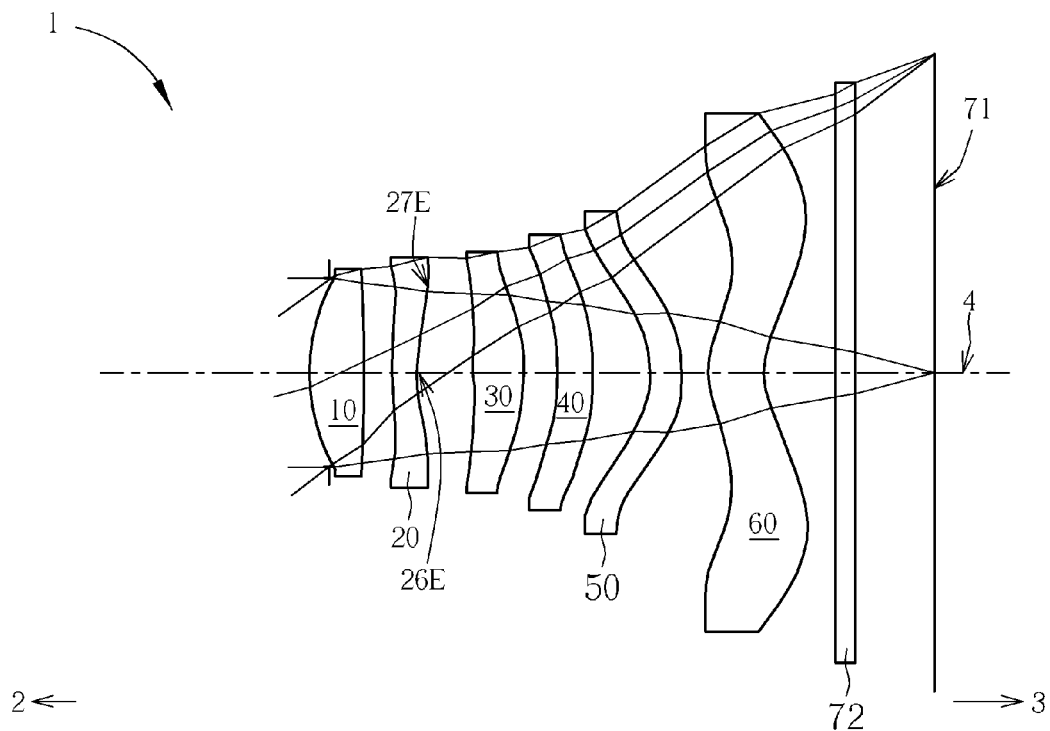
FIG. 11 illustrates a sixth example of the optical imaging lens set of six lens elements of the present invention.
Figures 12A, 12B, 12C, 12D:
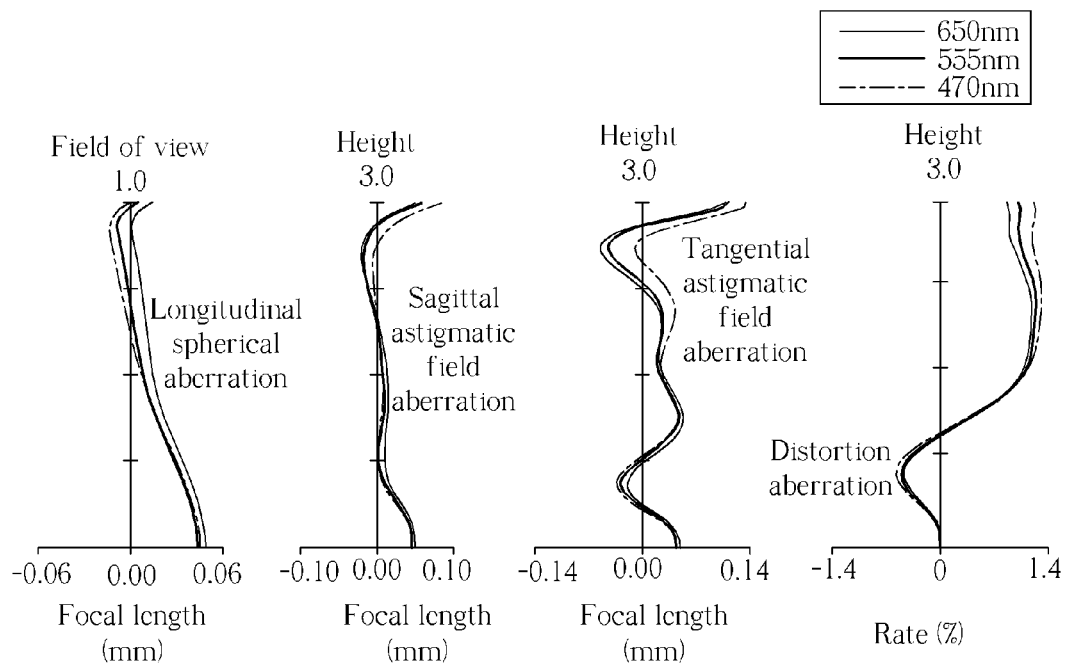
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the second image-side surface 22 of the second lens element 20 has a concave part 26E in the vicinity of the optical axis and a convex part 27E in a vicinity of its circular periphery. The optical data of the sixth example of the optical imaging lens set are shown in FIG. 28 while the aspheric surface data are shown in FIG. 29. The length of the optical imaging lens set is 4.903 mm. The image height is 3.0 mm, HFOV is 39.21 degrees. Some important ratios of the sixth example are as follows:
T1/AG45=1.276
T6/T2=2.266
T5/T2=1.295
AAG/T2=4.239
AG23/(AG12+AG34)=0.813
AAG/(AG12+AG56)=4.765
(AG34+AG56)/AG23=0.932
AAG/T6=1.871
T1/T3=1.051
T4/AG23=1.386
AAG/(AG12+AG34)=3.354
ALT/T4=7.101
T6/AG23=2.206
T3/T5=1.554
ALT/T5=7.808
T5/T4=0.909
AAG/T4=2.978

Seventh Example

Figure 13:
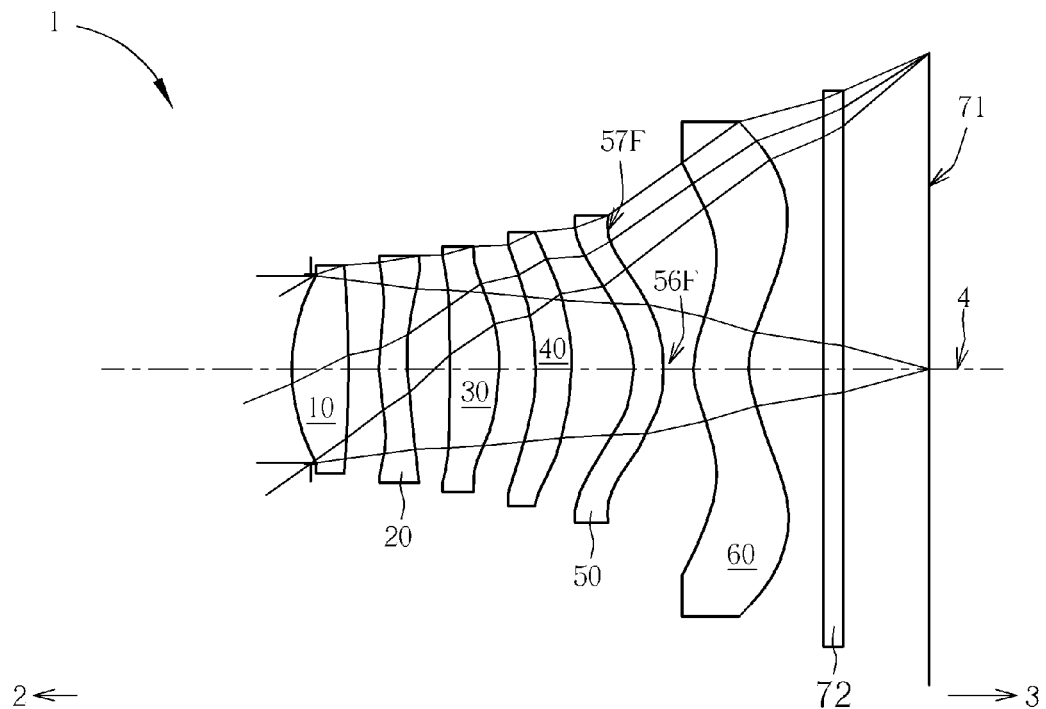
FIG. 13 illustrates a seventh example of the optical imaging lens set of six lens elements of the present invention.
Figures 14A, 14B, 14C, 14D:
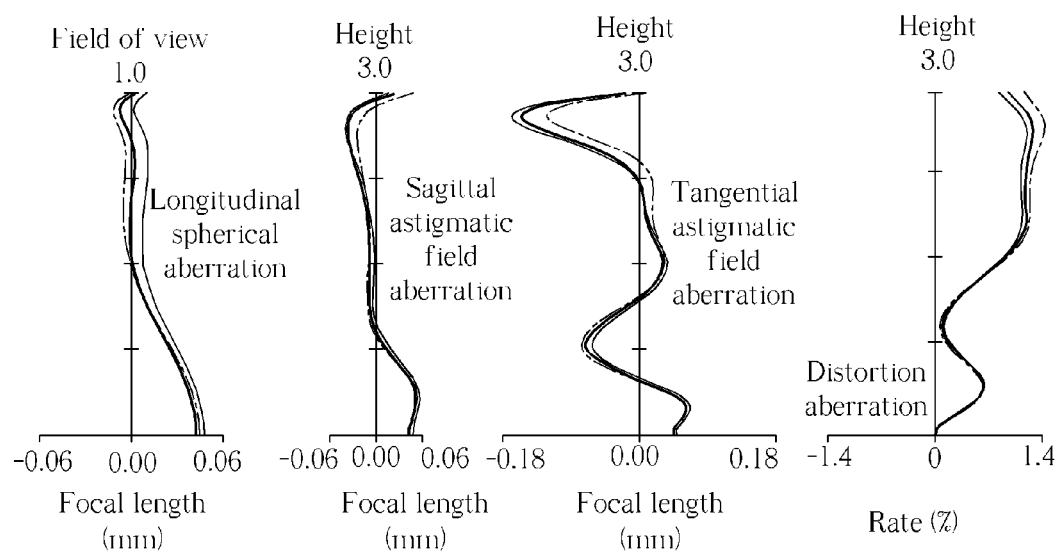
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the fifth image-side surface 52 of the fifth lens element 50 has a convex part 56F in the vicinity of the optical axis and a concave part 57F in a vicinity of its circular periphery. The optical data of the seventh example of the optical imaging lens set are shown in FIG. 30 while the aspheric surface data are shown in FIG. 31. The length of the optical imaging lens set is 4.982 mm. The image height is 3.0 mm, HFOV is 38.81 degrees. Some important ratios of the sixth example are as follows:
T1/AG45=2.007
T6/T2=2.237
T5/T2=1.251
AAG/T2=4.010
AG23/(AG12+AG34)=1.243
AAG/(AG12+AG56)=3.301
(AG34+AG56)/AG23=1.083
AAG/T6=1.793
T1/T3=1.153
T4/AG23=1.269
AAG/(AG12+AG34)=4.302
ALT/T4=6.984
T6/AG23=1.931
T3/T5=1.600
ALT/T5=8.208
T5/T4=0.851
AAG/T4=2.727

Some important ratios in each example are shown in FIG. 32. In light of the above examples, the inventors observe the following features:

The first lens element has positive refractive power, to provide the needed refractive power for the optical imaging lens set. The second lens element has negative refractive power, to correct aberration. In addition, the aperture stop is disposed between the object side and the first lens element, helping to collect the image light and decreasing the total length of the optical imaging lens set. Besides, the first object-side surface of the first lens element has a convex part in a vicinity of the optical axis and a convex part in a vicinity of its circular periphery can help to collect the image light; the second object-side surface of the second lens element has a concave part in a vicinity of its circular periphery, the third object-side surface of the third lens element has a concave part in a vicinity of its circular periphery, the third image-side surface of the third lens element has a convex part in a vicinity of the optical axis, the fourth image-side surface of the fourth lens element has a convex part in a vicinity of the optical axis, the fifth object-side surface of the fifth lens element has a concave part in a vicinity of its periphery, the fifth image-side surface of the fifth lens element has a convex part in a vicinity of the optical axis, and the sixth image-side surface of the sixth lens element has a convex part in a vicinity of its periphery, where each of the surfaces matches each other, in order to improve the aberration.

In addition, the inventors discover that there are some better ratio ranges for different data according to the above various important ratios. Better ratio ranges help the designers to design the better optical performance and an effectively reduced length of a practically possible optical imaging lens set. For example:

(1) $T1/AG45 \leq 2.1$:

AG45 is an air gap between said fourth lens element and said fifth lens element along the optical axis. If AG45 is maintained within a relatively large value, it would help to increase the optical performance. And T1 is the thickness of the first lens element, and decreasing T1 can help for shrinking the total length of the optical imaging lens set. Therefore, $T1/AG45$ should preferably be small. If the relationship $T1/AG45 \leq 2.1$ is satisfied, ideally, it is suggested that the range may be 0.8~2.1.

(2) $AAG/T2 \leq 4.8$, $AAG/T6 \leq 2.0$, $AAG/T4 \leq 3.3$:

AAG is the sum of total five air gaps between adjacent lens elements from the first lens element to the sixth lens element along the optical axis. Decreasing AAG can help for shrinking the total length of the optical imaging lens set. And T2, T4 T6 are the thicknesses of the second lens element, the fourth lens element and the sixth lens element along said optical axis respectively. Considering the difficulties of during the manufacturing process, T2, T4 and T6 cannot be shrunk effectively, but AAG can be shrunk more compared with T2, T4 and T6. Therefore, AAG/T2, AAG/T6 and AAG/T4 should preferably be small. If the relationship $AAG/T2 \leq 4.8$ is satisfied, ideally, it is suggested that the range may be 2.0~4.8; If the relationship $AAG/T6 \leq 2.0$ is satisfied, ideally, it is suggested that the range may be 0.8~2.0; If the relationship AAG/T4 is satisfied, ideally, it is suggested that the range may be 2.0~3.3.

(3) $T6/T2 \leq 3.5$, $T5/T2 \leq 2.0$, $T1/T3 \leq 1.4$, $ALT/T4 \leq 9.0$, $T3/T5 \geq 1.2$, $ALT/T5 \geq 5.0$, $T5/T4 \leq 1.5$:

T1~T6 are the thicknesses of the first lens element to the sixth lens element along said optical axis respectively. ALT is the total thickness of said first lens element, said second lens element, said third lens element, said fourth lens element, said fifth lens element and said sixth lens element along said optical axis. Those parameters should be maintained within a suitable value range. Otherwise, the total length cannot be thinned if one lens element has too big central thickness, or it's difficult to manufacture the optical imaging lens set if one lens element has too small central thickness. If the relationship $T6/T2 \leq 3.5$ is satisfied, ideally, it is suggested that the range may be 1.5~3.5; If the relationship $T5/T2 \leq 2.0$ is satisfied, ideally, it is suggested that the range may be 0.8~2.0; If the relationship $T1/T3 \leq 1.4$ is satisfied, ideally, it is suggested that the range may be 0.7~1.4; If the relationship $ALT/T4 \leq 9.0$ is satisfied, ideally, it is suggested that the range may be 5.0~9.0; If the relationship $T3/T5 \geq 1.2$ is satisfied, ideally, it is suggested that the range may be 1.2~2.0; If the relationship $ALT/T5 \geq 5.0$ is satisfied, ideally, it is suggested that the range may be 5.0~10.0; If the relationship $T5/T4 \leq 1.5$ is satisfied, ideally, it is suggested that the range may be 0.7~1.5.

(4) $AG23/(AG12+AG34) \leq 1.85$, $AAG/(AG12+AG56) \geq 3.0$, $(AG34+AG56)/AG23 \leq 1.2$, $AAG/(AG12+AG34) \leq 6.5$:

AG12 is an air gap between said first lens element and said second lens element along the optical axis. AG23 is an air gap between said second lens element and said third lens element along the optical axis. AG34 is an air gap between said third lens element and said fourth lens element along the optical axis. AG56 is an air gap between said fifth lens element and said sixth lens element along the optical axis. AAG is the sum of total five air gaps between adjacent lens elements from the first lens element to the sixth lens element along the optical axis. As mentioned above, those parameters should be maintained within a suitable value range. Otherwise, the total length cannot be thinned if every two adjacent lens elements have too big air gap, or it's difficult to manufacture the optical imaging lens set if every two adjacent lens elements have too small air gap. If the relationship $AG23/(AG12+AG34) \leq 1.85$ is satisfied, ideally, it is suggested that the range may be 0.7~1.85; If the relationship $AAG/(AG12+AG56) \geq 3.0$ is satisfied, ideally, it is suggested that the range may be 3.0~7.0; If the relationship $(AG34+AG56)/AG23 \leq 1.2$ is satisfied, ideally, it is suggested that the range may be 0.3~1.2; If the relationship $AAG/(AG12+AG34) \leq 6.5$ is satisfied, ideally, it is suggested that the range may be 3.0~6.5.

(5) Preferably, T4/AG23 is suggested to be larger than or equal to 1.0; T6/AG23 is suggested to be smaller than or equal to 2.8, avoiding AG23 being too big or too small; T4/AG23 is suggested to be between 1.0~1.6; T6/AG23 is suggested to be between 1.5~2.8.

Figure 16:
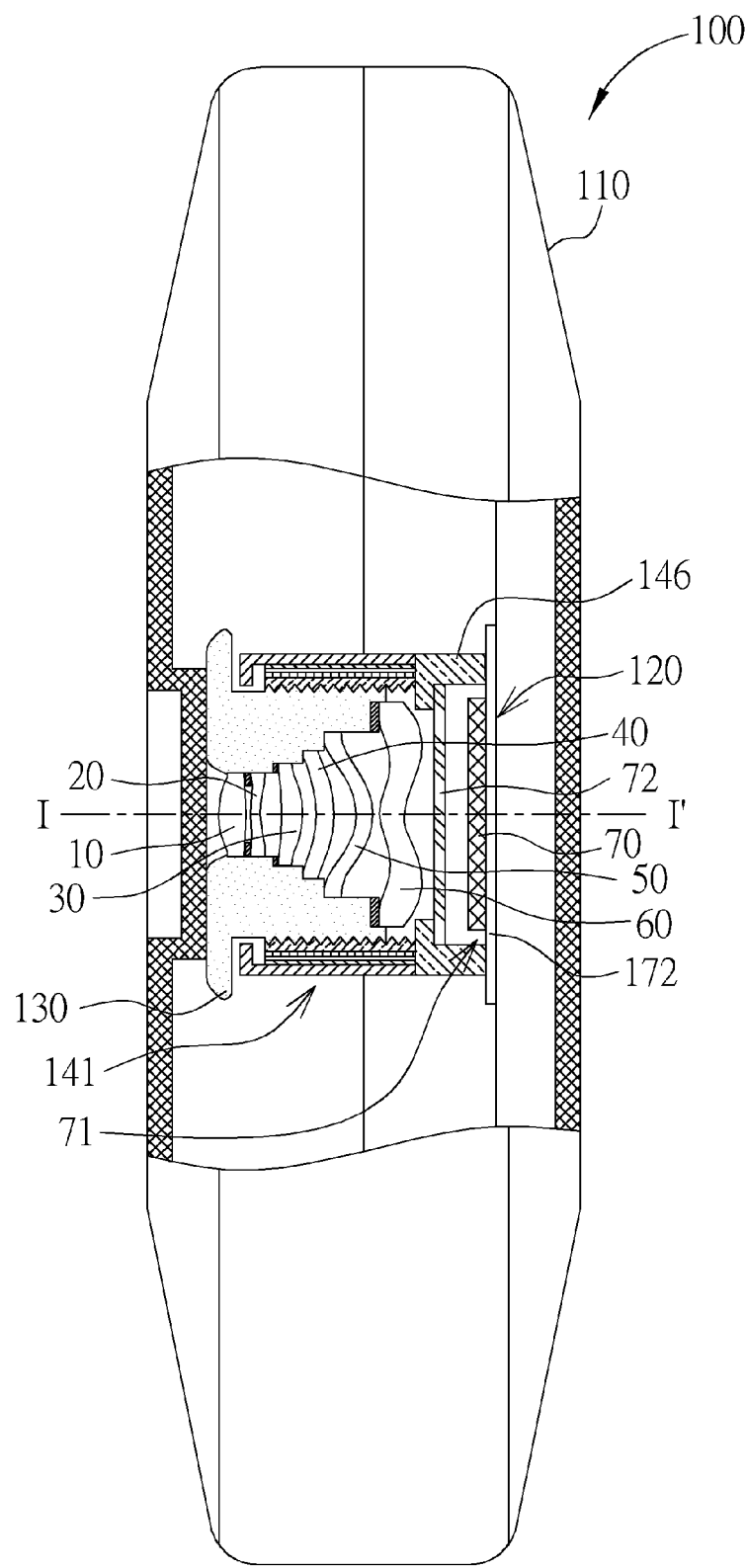
FIG. 16 illustrates a first preferred example of the portable electronic device with an optical imaging lens set of the present invention.

The optical imaging lens set 1 of the present invention may be applied to an electronic device, such as mobile phones or driving recorders. Please refer to FIG. 16. FIG. 16 illustrates a first preferred example of the optical imaging lens set 1 of the present invention for use in a portable electronic device 100. The electronic device 100 includes a case 110, and an image module 120 mounted in the case 110. A mobile phone is illustrated in FIG. 16 as an example, but the electronic device 100 is not limited to a mobile phone.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 17:
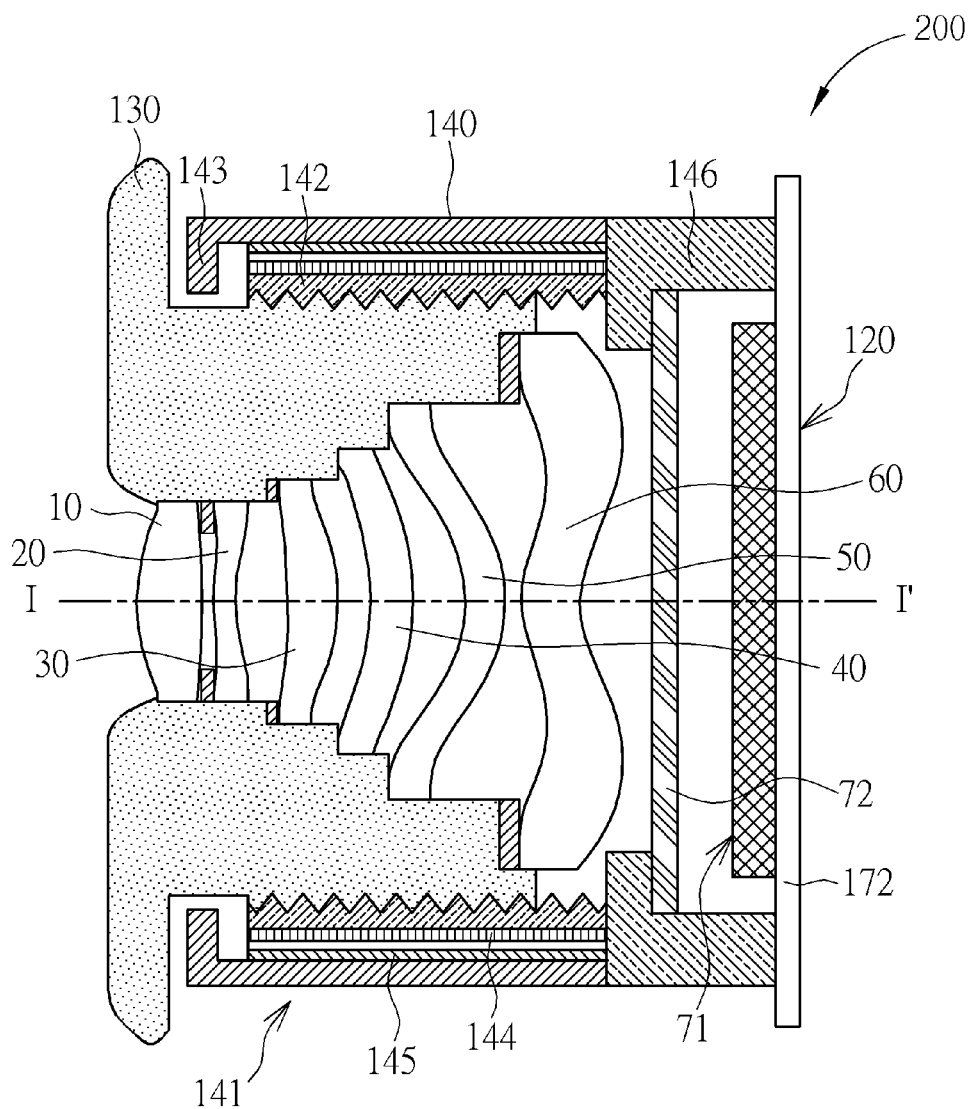
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: an aperture stop, a first lens element, a second lens element, a third lens element, a fourth lens element, a fifth lens element and a sixth lens element, said first to sixth lens elements having an object-side surface facing toward the object side as well as an image-side surface facing toward the image side, wherein:
   the first lens element has a positive refracting power, an object-side surface is a convex surface, having a convex part in a vicinity of the optical axis, and a convex part in a vicinity of its periphery;
   the second lens element has a negative refracting power and an object-side surface with a concave part in a vicinity of its periphery;
   the third lens element has an object-side surface with a concave part in a vicinity of its periphery, and an image-side surface with a convex part in a vicinity of the optical axis;
   the fourth lens has an image-side surface with a convex part in a vicinity of the optical axis;
   the fifth lens element has an object-side surface with a concave part in a vicinity of its periphery, and an image-side surface with a convex part in a vicinity of the optical axis; and
   the sixth lens element has an image-side surface with a convex part in a vicinity of its periphery;
   the optical imaging lens set does not include any lens element with refractive power other than said first lens element, second lens element, third lens element, fourth lens element, fifth lens element and sixth lens element, in addition, a thickness T1 of said first lens element along said optical axis, and an air gap AG45 between said fourth lens element and said fifth lens element along said optical axis satisfy a relationship $T1/AG45 \leq 2.1$.

2. The optical imaging lens set of claim 1, wherein a thickness T6 of said sixth lens element along said optical axis, and a thickness T2 of said second lens element along said optical axis satisfy a relationship $T6/T2 \leq 3.5$.

3. The optical imaging lens set of claim 2, wherein the sum of all five air gaps AAG between each lens element from said first lens element to said sixth lens element along the optical axis, an air gap AG12 between said first lens elements and said second lens element along said optical axis, and an air gap AG56 between said fourth lens elements and said sixth lens element along said optical axis satisfy a relationship $3.0 \leq AAG/(AG12+AG56)$.

4. The optical imaging lens set of claim 2, wherein an air gap AG34 between said third lens elements and said fourth lens element along said optical axis, an air gap AG56 between said fifth lens elements and said sixth lens element along said optical axis, and an air gap AG23 between said second lens elements and said third lens element along said optical axis satisfy a relationship $(AG34+AG56)/AG23 \leq 1.2$.

5. The optical imaging lens set of claim 2, wherein the sum of all five air gaps AAG between each lens element from said first lens element to said sixth lens element along the optical axis satisfies a relationship $AAG/T6 \leq 2.0$.

6. The optical imaging lens set of claim 1, wherein a thickness T5 of said fifth lens element along said optical axis, and a thickness T2 of said second lens element along said optical axis satisfy a relationship $T5/T2 \leq 2.0$.

7. The optical imaging lens set of claim 6, wherein a thickness T3 of said third lens element along said optical axis satisfies a relationship $T1/T3 \leq 1.4$.

8. The optical imaging lens set of claim 6, wherein an air gap AG23 between said second lens elements and said third lens element along said optical axis, and a thickness T4 of said fourth lens element along said optical axis satisfy a relationship $1.0 \leq T4/AG23$.

9. The optical imaging lens set of claim 6, wherein the sum of all five air gaps AAG between each lens element from said first lens element to said sixth lens element along the optical axis, an air gap AG12 between said first lens elements and said second lens element along said optical axis, and an air gap AG34 between said third lens elements and said fourth lens element along said optical axis satisfy a relationship $AAG/(AG12+AG34) \leq 6.5$.

10. The optical imaging lens set of claim 1, wherein the sum of all five air gaps AAG between each lens element from said first lens element to said sixth lens element along the optical axis, and a thickness T2 of said second lens element along said optical axis satisfy a relationship $AAG/T2 \leq 4.8$.

11. The optical imaging lens set of claim 10, wherein a total thickness ALT of said first lens element, said second lens element, said third lens element, said fourth lens element, said fifth lens element and said sixth lens element along said optical axis, and a thickness T4 of said fourth lens element along said optical axis satisfy a relationship $ALT/T4 \leq 9.0$.

12. The optical imaging lens set of claim 10, wherein a thickness T6 of said sixth lens element along said optical axis, and an air gap AG23 between said second lens elements and said third lens element along said optical axis satisfy a relationship $T6/AG23 \leq 2.8$.

13. The optical imaging lens set of claim 10, wherein a thickness T3 of said third lens element along said optical axis, and a thickness T5 of said fifth lens element along said optical axis satisfy a relationship $1.2 \leq T3/T5$.

14. The optical imaging lens set of claim 1, wherein an air gap AG12 between said first lens elements and said second lens element along said optical axis, an air gap AG23 between said second lens elements and said third lens element along said optical axis, and an air gap AG34 between said third lens elements and said fourth lens element along said optical axis satisfy a relationship $AG23/(AG12+AG34) \leq 1.85$.

15. The optical imaging lens set of claim 14, wherein a total thickness ALT of said first lens element, said second lens element, said third lens element, said fourth lens element, said fifth lens element and said sixth lens element along said optical axis, and a thickness T5 of said fifth lens element along said optical axis satisfy a relationship $5.0 \leq ALT/T5$.

16. The optical imaging lens set of claim 14, wherein a thickness T4 of said fourth lens element along said optical axis, and a thickness T5 of said fifth lens element along said optical axis satisfy a relationship $T5/T4 \leq 1.5$.

17. The optical imaging lens set of claim 14, wherein the sum of all five air gaps AAG between each lens element from said first lens element to said sixth lens element along the optical axis, and a thickness T4 of said fourth lens element along said optical axis satisfy a relationship $AAG/T4 \leq 3.3$.

18. An electronic device, comprising:
  a case; and
  an image module disposed in said case and comprising:
    an optical imaging lens set of claim 1;
    a barrel for the installation of said optical imaging lens set;
    a module housing unit for the installation of said barrel;
    a substrate for the installation of said module housing unit; and
    an image sensor disposed on the substrate and disposed at an image side of said optical imaging lens set.

\* \* \* \* \*